US008165633B2

(12) United States Patent
Chang et al.

(10) Patent No.: US 8,165,633 B2
(45) Date of Patent: Apr. 24, 2012

(54) PASSIVE INTERFACE AND SOFTWARE CONFIGURATION FOR PORTABLE DEVICES

(75) Inventors: Eric Chang, Beijing (CN); David Dehghan, Sammamish, WA (US); Stanley Sun, Beijing (CN); Weihun Liew, Beijing (CN); Kong-Kat Wong, Seattle, WA (US); Yongzhi Yang, Beijing (CN); James Cao, Beijing (CN); Zhifeng Wang, Beijing (CN); Rebecca Sundling, Beijing (CN)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 11/968,195

(22) Filed: Jan. 2, 2008

(65) Prior Publication Data

US 2009/0023395 A1      Jan. 22, 2009

Related U.S. Application Data

(60) Provisional application No. 60/959,732, filed on Jul. 16, 2007.

(51) Int. Cl.
*H04B 1/38*      (2006.01)

(52) U.S. Cl. .................... 455/557; 455/566; 710/305

(58) Field of Classification Search ............... 455/556.1, 455/557, 90.3, 41.1, 41.2, 41.3; 710/305; 709/203
See application file for complete search history.

(56) References Cited

U.S. PATENT DOCUMENTS

| | | | |
|---|---|---|---|
| 5,497,339 A | 3/1996 | Bernard | |
| 5,675,524 A | 10/1997 | Bernard | |
| 6,044,337 A | 3/2000 | Gorin et al. | |
| 6,167,398 A | 12/2000 | Wyard et al. | |
| 6,286,060 B1 | 9/2001 | DiGiorgio et al. | |
| 6,446,127 B1 | 9/2002 | Schuster et al. | |
| 6,571,210 B2 | 5/2003 | Hon et al. | |
| 6,625,472 B1 | 9/2003 | Farazmandnia et al. | |
| 6,760,804 B1 | 7/2004 | Hunt et al. | |
| 6,839,671 B2 | 1/2005 | Attwater et al. | |
| 6,975,856 B2 | 12/2005 | Ogasawara | |
| 6,980,546 B2 * | 12/2005 | Purpura et al. | 370/352 |
| 7,177,597 B2 | 2/2007 | Jung et al. | |

(Continued)

FOREIGN PATENT DOCUMENTS

WO      WO0209023      1/2002

(Continued)

OTHER PUBLICATIONS

International Search Report mailed Jan. 29, 2009; PCT/US2008/070231; 12 pages.

(Continued)

*Primary Examiner* — Ping Hsieh

(57) ABSTRACT

A universal passive interface for connecting external systems to smart devices such as cell phones and PDAs. The passive system includes a cradle for receiving a compatible smart device that connects the functionality of the smart device to a wide variety of external systems (e.g., printers, large display, input devices, etc.). The passive interface includes a USB hub, network port, and other common connector ports for peripherals and other systems. The smart device can connect to the passive system via the cradle slot, a tether, and/or wirelessly. The external systems to which the passive system serves at the interface to the smart device include, but are not limited to, large displays (e.g., television), external monitors, input devices such as mice and keyboards, external storage devices, and networks (wired and/or wireless). A wizard allows the user to configure the external systems to work with the smart device.

20 Claims, 22 Drawing Sheets

U.S. PATENT DOCUMENTS

| | | |
|---|---|---|
| 7,912,503 B2 | 3/2011 | Chang et al. |
| 7,912,707 B2 | 3/2011 | Yu et al. |
| 2001/0034803 A1* | 10/2001 | Sorek et al. .................. 710/129 |
| 2002/0103008 A1 | 8/2002 | Rahn et al. |
| 2002/0118836 A1* | 8/2002 | Howard et al. ............... 380/262 |
| 2003/0191625 A1 | 10/2003 | Gorin et al. |
| 2004/0014423 A1* | 1/2004 | Croome et al. ............. 455/41.2 |
| 2004/0097127 A1 | 5/2004 | Smith et al. |
| 2004/0204074 A1 | 10/2004 | Desai |
| 2005/0004799 A1 | 1/2005 | Lyudovyk |
| 2005/0135393 A1* | 6/2005 | Benco et al. .................. 370/408 |
| 2005/0171761 A1 | 8/2005 | Ju et al. |
| 2005/0228657 A1 | 10/2005 | Chou et al. |
| 2006/0119315 A1* | 6/2006 | Sasaki et al. ................. 320/106 |
| 2006/0259942 A1 | 11/2006 | Toyama et al. |
| 2007/0005840 A1 | 1/2007 | Cheng et al. |
| 2007/0021148 A1 | 1/2007 | Mahini |
| 2007/0038785 A1 | 2/2007 | Varanda et al. |
| 2007/0130592 A1 | 6/2007 | Haeusel |
| 2007/0136264 A1 | 6/2007 | Tran |
| 2008/0091443 A1 | 4/2008 | Strope et al. |
| 2011/0137639 A1 | 6/2011 | Yu et al. |

FOREIGN PATENT DOCUMENTS

| | | |
|---|---|---|
| WO | WO0209023 A1 | 1/2002 |
| WO | WO03065227 | 8/2003 |
| WO | WO03065227 A1 | 8/2003 |

OTHER PUBLICATIONS

International Search Report mailed Jan. 29, 2009; PCT/US2008/070237; 13 pages.

Bostwick, et al.; "Innovative User Interfaces that use Mobile Devices at the Same Time as PCs"; Apr. 2000; http:www.teco.edu/chi2000ws/papers/31_myers.htm; pp. 1-4.

Bennani, N.; "Integrating a Digital Camera in the Home Environment: Architecture and Prototype"; *Tamkang Journal of Sciences and Engineering*; vol. 4, No. 1; 2001; pp. 1-8.

Bostwick et al., "Innovative User Interfaces that use Mobile Devices at the Same Time as PCs", retrieved at <<http: www.teco.edu/chi2000ws/papers/31_myers.htm>>.

Bennani, "Integrating a Digital Camera in the Home Environment: Architecture and Prototype", vol. 4, No. 1, 2001, Tamkang Journal of Science and Engineering.

Jose, "Cypress Introduces Media Transfer Protocol 'Data Pipe' for Protected Content on Next Generation Portable Media Players", Jul. 6, 2004, Cypress Semiconductor Corp.

"MCCI Media Transfer Protocol", MCCI.

"Media Transfer Protocol (MTP) Device Drivers", retrieved at<<http://www.centrillium.it.com/Projects/MTP.htm>>.

"Nucleus Supports Microsoft Media Transfer Protocol for Digital Devices", Feb. 8, 2006, retrieved at<<http://www.embeddedstar.com/press/content/2006/2/embedded19515.html>>.

* cited by examiner

PASSIVE INTERFACE AND SOFTWARE CONFIGURATION FOR PORTABLE DEVICES

CROSS-REFERENCE TO RELATED APPLICATIONS

This application claims the benefit of U.S. Provisional Patent application Ser. No. 60/959,732 entitled "PORTABLE DEVICE MULTIPLE INTERFACE HUB" and filed Jul. 16, 2007, the entirety of which is incorporated by reference herein. This application is related to co-pending U.S. patent application Ser. No. 11/952,152 entitled "SMART INTERFACE SYSTEM FOR MOBILE COMMUNICATIONS DEVICES" filed on Dec. 7, 2007.

BACKGROUND

Smart devices such as cell phones are ubiquitous in personal and business settings. Advances in the design and computing capabilities of such devices serve as the catalyst for demanding more access to these capabilities by consumers. For example, cameras, text messaging, display systems are some features provided in addition to the basic call functionality originally provided for such smart devices. Moreover, the ability to now connect to services on both IP and cellular communications networks further drives the demand for more systems that provide convenient access to these services and functionality.

This becomes particularly desirable in emerging markets where the average user may have a handheld mobile communications device such as a smart phone with functionality that could be accessed and provide a benefit to the device user without the need to purchase a portable or desktop computer. This is because voice communications between users may typically be considered more valuable to the user than a computing system. Moreover, the cost of cell phones is significantly less than computing systems at many levels. For example, the phones can be obtained for free or at a nominal cost based on the dialing plan to which the user subscribes. However, the cell phone is rapidly evolving into a smart communications device that can provide sufficient computing power and functionality to drive a wide variety of peripherals as well as access network services. A major impediment to taking advantage of this evolving technology in the cell phone, for example, is the inability to connect the phone to peripheral devices and systems. The lack of extensibility limits the user to the small screen and difficult input method of the cell phone.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a passive interface system and client software for connecting different types of peripherals, networks, and other systems to handheld smart devices such as mobile phones and/or personal digital assistant (PDA), for example. The passive interface system is a lightweight, cost effective apparatus for accessing the functionality of such small devices, and interfacing that functionality to the peripheral devices, networks and other systems. The passive interface system includes at least several USB ports, a network port, and a display port for interfacing the phone to USB devices, networks and displays, for example. In the context of the a cell phone, for example, the passive interface system provides common physical connections for connecting cell phone functionality to the many different types of compatible peripheral devices (e.g., printers, display, TVs, etc.), networks, and systems.

The passive interface system allows the smart device to connect to larger presentation systems such as displays, televisions, audio systems, and/or monitors, for example. When connecting to multiple presentation systems, the passive interface system facilitates enhancement of the user experience by allowing the user to switch between the displays (e.g., small and large, TV, other device displays, etc.) in a seamless way. Setup, configuration and help features by way of a wizard program assist the user in making a basic, as well as enhanced, setup.

The USB and network operability further facilitates interfacing the passive interface system to another passive interface system device-to-device connectivity through the systems.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
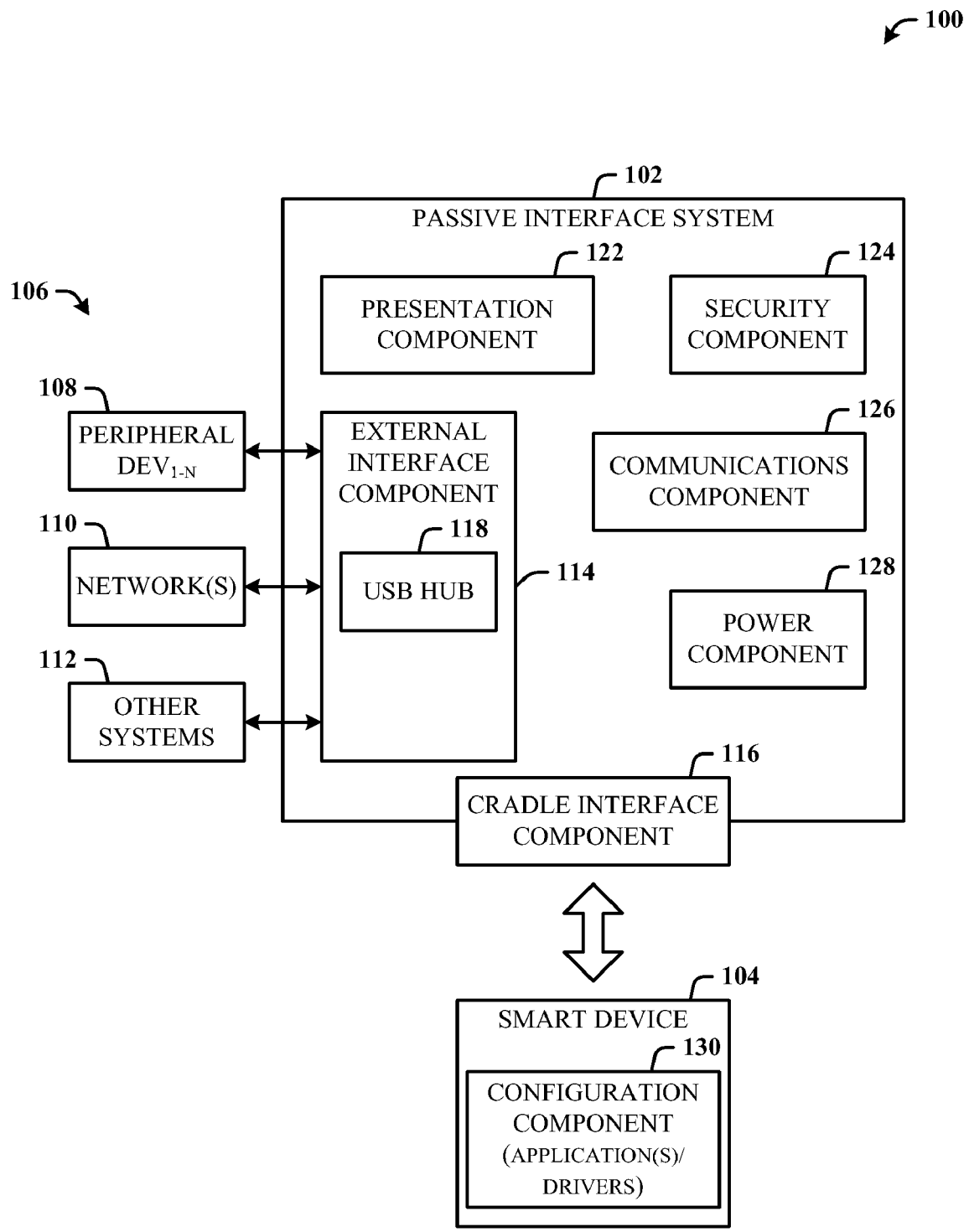
FIG. 1 illustrates a diagram of an exemplary passive interface environment.

The disclosed mechanism is a passive interface system (also referred to as a passive system or interface system) for at smart handheld devices. These handheld devices can be mobile communications device such as a cell phone and PDA having mobile communication functionality, game controllers, audio players, video players and the like. The passive interface system also includes a cradle for receiving a compatible smart device and interfacing the smart device to external systems such as peripherals (e.g., printers, cameras, displays, TVs, etc.), networks (e.g., IP networks), and other systems (e.g., cable boxes, home audio systems, etc.). Thus, the functionality of the external systems can be accessed at some level by the smart handled device based on the capabilities of the handheld device. In support of this capability, an application and drivers (e.g., printers, USB devices, displays, networks, etc.) can be installed on the smart hand device to facilitate accessing the functionality of the external systems.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a diagram of an exemplary passive interface environment 100. The environment 100 includes a passive interface system 102 (also referred to as passive interface and interface system or passive system) for interfacing a smart device 104 (e.g., mobile communications device, PDA, etc.) to external systems 106. The external systems 106 can include peripheral devices 108, networks 110, and other systems 112. The peripheral devices 108 can include televisions (TVs), monitors, displays (e.g., CRT, e-paper, LCD, plasma, micro displays for near-to-the-eye head mounted system, etc.), projectors, mice, keyboards, gesture input systems, touchpads, touch screen displays, and other human interface devices (HIDs).

The peripheral devices 108 can also include printers, cameras, audio and audio processing systems (e.g., speakers, electronic music systems, etc.), image/video and image/video processing systems (e.g., video cameras, digital cameras, scanners, etc.), and storage systems (e.g., USB (universal serial bus) drives, IEEE 1394 drives, external drives, flash drives, etc.), for example. The networks 110 include the IEEE 802 family of wire and wireless networks. The other systems 112 can include set-top-boxes (e.g., cable TV boxes), high-definition systems, home theater systems, security systems, and sensor systems (e.g., temperature, humidity, pressure, time, location, etc.), for example.

The passive system 102 includes an external interface component (or cradle interface) 114 for interfacing the smart device 104 to the external systems 106. Accordingly, the external interface component 114 includes the hardware and/or logic for handling (e.g., passing through) the protocols and signals used by the external systems 106 in communication with the smart device 104 (e.g., cell phone). The cradle interface 114 can mechanically receive the smart device 104 and electrically interface the smart device 104 to the peripheral devices 108 and the network 110 via the external interface component 114. For example, if a projector is connected as one of the peripheral devices 108, the external interface component 114 will handle the basic communications (e.g., protocols and signals) between the projector and passive system 102.

The external interface component 114 includes a multiport USB hub 118 (e.g., three ports) for interfacing to USB devices (e.g., printers, cameras, game controller, music players, video players, USB flash drive, USB hard drive, etc.). Other interfaces include, but are not limited to, video ports (e.g., VGA), parallel ports, audio ports (e.g., for headphones, external audio systems, microphone, etc.), and network ports (e.g., Ethernet), for example. The USB hub 118 can provide powered and unpowered USB connectivity to the peripheral devices 108 and other systems 112.

A cradle interface component 116 (also referred to as the cradle or cradle component) facilitates the mechanical and electrical engagement (via a cradle slot) of the smart device 104 to the passive system 102. The cradle component 116 includes the mechanical guides and connectors (e.g., power, data, and signal) for making a secure insertion and engagement of the smart device 104 to the passive system 102. The design of the cradle interface component 116 (which includes the cradle subsystem and cradle slot) for receiving the smart device 104 facilitates the upright orientation and positioning of the smart device 104 when seated in the passive system 102 for convenient user interaction with an optimum number of features of the smart device 104 such as the keypad, device display, audio output (e.g., speakers), audio input (e.g., microphone), device camera (e.g., lens for capturing images), and so on.

Once properly seated, the passive system 102 auto-detects the presence of the smart device 104 and security processing can begin to ensure that exposure of the passive system functionality is proper and authorized. Once properly authorized, the smart device 104 can obtain full access to the passive system components and the external systems 106 connected (e.g., tethered) or in communication (e.g., wireless) therewith. Once electrically engaged, the cradle interface 116 senses the smart device 104 and sends a cradle signal to the configuration component of the smart device 104.

In an alternative embodiment, if access by the smart device 104 to the passive system 102 is deemed unauthorized, the passive system 102 can be configured to expose only a low-level or minimum set of functionality such that the user of the smart device 104 can be notified to disconnect or instructed as to how to obtain full functionality of the passive system 102. For example, if unauthorized, the smart device 104 can be allowed minimal Internet access to a website that instructs the user though a process for obtaining full access.

Another example includes allowing limited printer access to printout instructions or other information when the smart device 104 is deemed to be unauthorized. Yet another example, when seated and detected in the cradle slot, but deemed unauthorized, the passive system 102 can cause information to be printed to a connected printer that notifies the user of the problem and instructs the user how to correct it. As will be described further below, the passive system 102 can also present status information to the user via the smart device 104 display or a display built-in to the passive system 102.

The passive system 102 can also include a slot interface for the insertion and removal of flash memory cards for added memory capability. Additional memory or storage can also be provided by USB drives and related flash memory devices. Additional memory needs for storing programs and data, for example, can be provided using external peripherals 108 such as a CDROM, micro-drives, solid-state drives (SSDs), etc.

A presentation component 122 provides presentation capabilities related to, for example, text, images, video, graphics, alerts, etc. In other words, the passive system 102 can include a display (e.g., e-paper, LCD) and indicators (e.g., LEDs) for presenting information ranging from low-resolution to high-resolution multimedia related not only to operation and functionality of the passive system 102, but also of connectivity status and functionality related to the external systems 106 and the smart device 104.

The audio aspect of the presentation component 122 facilitates audio output ranging from operational beeps and alerts related to operational state of the passive system 102 and the pass-though of audio data and signal to a peripheral audio device or system. For example, if the user plays an audio file on the smart device 104, the associated signals are passed-though the passive system 102 to an audio system.

This can also connecting a microphone into the passive system 102 where the voice signals are passed through the passive system 102 to an external audio system for processing and output.

The passive system 102 can also include a security component 124 for providing access security not only to the passive system functionality and components, but also to the external systems 106 and the smart device 104. For example, the security component 124 can facilitate the generation and exchange of private and/or public keys between the smart device 104 and the passive system 102 for the encryption of communications. The encryption can be selectively enabled between the passive system 102 and the smart device 104, between the passive system 102 and one or more of the external systems 106, and/or from the smart device 104 to the passive system 102 and on to one or more of the external systems 106. Encryption via the security component 124 is optional. For example, the user may not want or need encryption when browsing the Internet via the passive system 102, yet invoke encryption when sending personal information wirelessly from the smart device 104 to the passive system 102.

The passive system 102 includes a communications component 126 for communicating the data and signals between the smart device 104 and/or the external systems 106 via wire and wireless communications protocols. The communications component 126 includes transceivers and/or modulation logic for transmitting and receiving in a wired and/or wireless manner. For example, when disengaged from the cradle interface component 116, the smart device 104 can communicate with the passive system 102 via short-range wireless technologies (e.g., Bluetooth, Wi-Fi).

It is also within contemplation of the subject architecture that when the smart device 104 is engaged in the cradle, the smart device 104 can obtain the full functionality of the passive system 102 while also communicating with the passive system 102 through a wireless Bluetooth headset, for example. This provides for VoIP (voice-over-IP) capability by processing voice signals through the passive system 102 to an external VoIP peripheral for providing VoIP communications. Alternatively, or in combination therewith, a VoIP client can be installed and running on the smart device 104 independent of attaching an extraneous VoIP peripheral or VoIP phone. Such capability can further be facilitated using a VoIP phone, for example, that tethers to the passive system 102 via the external interface component 114 rather than via the cradle interface 116.

The communications component 126 can also be used for wireless security. For example, an RFID (radio frequency identification) chip mounted in the passive system 102 can be scanned by an RFID reader in the smart device 104 to receive an encryption code that then will be used to encrypt communications of the authorized user. Alternatively, the smart 104 has an embedded RFID passive sensor that when brought into range of the passive system 102, is activated by an RFID reader of the passive system 102 to extract a code and other information stored in the RFID chip. The data stored in the RFID chip can then be used by the passive system 102 to access a network service via the networks 110 and determine if the smart device 104 is authorized to access full functionality of the passive system 102 and/or attached external system 106. The RFID system can be to uniquely recognize the passive system 102 and encrypt the communications channel using the private and public key infrastructure.

The passive system 102 can also include a power component 128 for providing onboard power to the passive system 102. The power component 128 can include a battery subsystem for battery backup, a converter subsystem for converting line voltage (US or international) to the proper voltage used by the passive system 102. The power component 128 can also include a charger subsystem for charging the passive system batteries, where provided. The power component 128 can also charge the smart device 104 when seated in the cradle 116 or tethered thereto via the external interface component 114. The charging can be directed over power lines engaged through the cradle interface 116 into the smart device 104 and/or a wireless power induction coupling subsystem that charges the batteries of the smart device 104 when in close proximity to the passive system 102. In one implementation, this can be managed based on whether the smart device 104 is authorized to access the passive system 102. If not authorized, no charging will be allowed. Alternatively, if not authorized, the low-level capabilities yet allowed to the smart device 104 can include charging of the smart device 104 batteries.

The smart device 104 can include a configuration component 130 that comprises one or more applications and drivers for accessing functionality not only of the passive system 102, but also of the connected external systems 106. For example, the configuration component 130 can include drivers for popular printers, displays, serial interface protocols, user preferences, user information, settings and drivers for smart devices (e.g., cell phones, PDAs with mobile functionality, controllers, etc.) and other devices that can connect to the passive system 102 through the cradle or a tether.

The configuration component 130 are provided for automatically sensing the passive system 102 (whether seated in the cradle, tethered, or in close proximity for short-range communications and/or RFID processing), and establishing operability between the smart device 104, passive system 102, and/or the external networks 106 (e.g., peripheral devices and networks). The configuration component 130 automatically detects the capabilities of the smart device 104, and instantiates additional functionality in the smart device 104, if needed, to provide additional feature access in the external systems 106 by the smart device 104. The configuration component 130 automatically changes behavior of the smart device 104 based on the smart device 104 interfacing to the passive interface system 102.

In one embodiment, once the smart device 104 detects the presence of the passive system 102 (e.g., via cradle slot insertion and seating, wireless communications, tethering, etc.), applications and drivers installed as part of the configuration component 130 on the smart device 104 for interacting with the passive system 102 will auto-configure one or more operating characteristics of the smart device 104 in accordance with the connected external systems 106 and/or capabilities of the passive system 102. For example, once the smart device 104 has engaged full functionality of the passive system 102, the configuration component 130 can automatically change the behavior or operating characteristics of certain subsystems of the smart device 104. When a large display is connected as one of the peripheral devices 108, the configuration component 130 can auto-configure and route the display functions and output of the smart device 104 to the large display, thereby driving the large display, the display on the passive system 102, and/or the display of the smart device 104. For example, the behavior of the system can be changed via the configuration component 130 for a privacy setting such that when a personal message (e.g., SMS-short message service, MMS-multimedia messaging service, e-mail, etc.) is received, the personal message will be routed to the smart device display rather than displayed publicly on the external display or TV monitor based on operating in a TV mode or a device mode. If the smart device 104 is docked in the passive system 102 cradle or in operative communications therewith through to a public (or external) display, the content of the message can be routed to the device (or internal) display when in smart device mode, and only a notification will be shown on the external display to provide more privacy. In a TV mode, all or a significant portion of the information is routed to the external TV monitor for presentation.

The passive system 102 and associated functionality can be designed and packaged as a modular system for insertion into other components, systems, and/or environments. For example, the passive system 102 can be built into a chassis, wall, panel, other hardware, etc., in buildings, vehicles, appliances, computers, PSTN (public switch telephone network) phones and VoIP phones, and so on.

Figure 2:
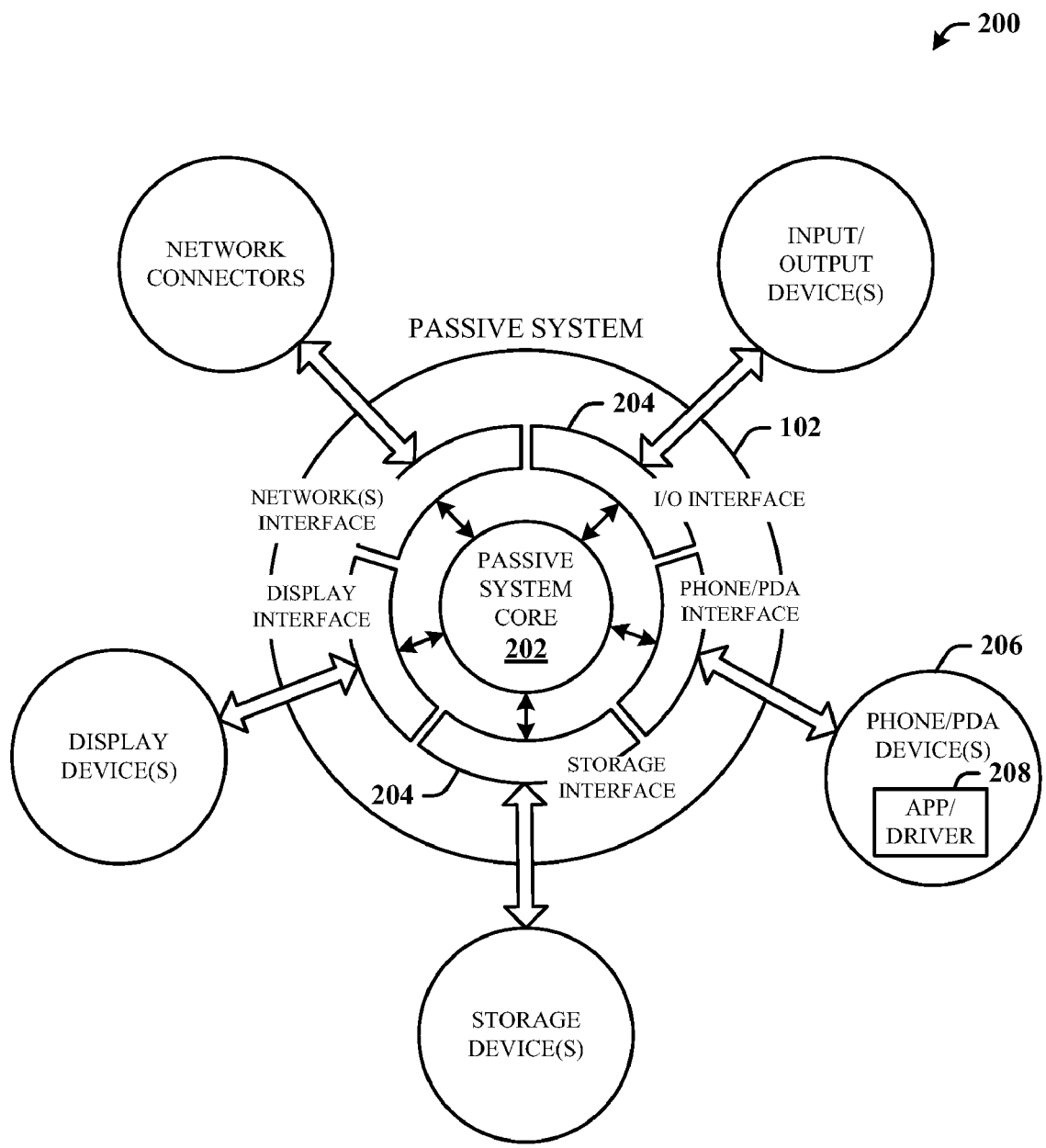
FIG. 2 illustrates an alternative representation of the passive system of FIG. 1.

FIG. 2 illustrates an alternative representation 200 of the passive system 102 of FIG. 1. The passive system 102 is a simplistic low-cost device. Accordingly, a goal to be accomplished with the passive system 102 is to address the basic needs of users. The passive system 102 can include one or more basic lights or indicators (e.g., LEDs) to indicate power or operational state when connected or not connected to the smart device. The passive system core 202 includes a minimal set of physical components for connecting a smart device (e.g., smart phone, PDA, or other similar devices) to the various types of peripherals in order to remain cost effective and affordable.

The representation 200 shows the passive system 102 as having a passive system core 202 that represents the internal components, functionality, and subsystems of FIG. 1. The passive system core 202 includes the circuits, logic, hardware and/or software for receiving, processing, and transmitting data and/or signals via one or more interfaces 204, and on-board media subsystems (e.g., display, speakers, etc.), between the smart device(s) 206 and external systems 106 of FIG. 1. The external systems 106 of FIG. 1 comprise display device(s), storage device(s), I/O device(s) and network connectors ("connector" defined here as software and/or hardware that facilitate an operable network connection).

For example, the interfaces 204 (only two of which are labeled) can be part of the external interface component 114 functionality of FIG. 1 and can include a phone/PDA interface (that includes the cradle interface 116) for connecting (e.g., tethered, wireless) smart devices 206 to the passive system core 202, a display interface for connecting to one or more display devices (e.g., TV, monitor, digital display, projectors, etc.), a storage interface for connecting to storage devices using different serial and/or parallel technologies (e.g., USB, IEEE 1394, wireless, infrared, USB flash memory stubs, solid state drives, external mass storage drives, flash drives, etc.), an input/output (I/O) interface for similar types of devices that facilitate user interaction (e.g., mouse, keyboard, touchpad, gesture system, microphone, etc.), peripheral devices (e.g., printers, copiers, scanners, cameras, etc.) and, a network interface for different types of wire/wireless networks (e.g., Ethernet, unlicensed, licensed, Wi-Fi, WiMax, Bluetooth, etc.). Other conventional types of interfaces can be employed as well.

In the context of the smart device being a smart cell phone, the phone itself can perform computations and processing for document processing, Internet browsing, and media playback, the functionality of which can be passed through the passive system 102 to the external systems.

There can be multiple types of phone interfaces: phone interfaces that work with feature phones or other closed systems—a standard connector interface and protocol can be defined, and whichever feature phone manufacture implements that interface will benefit from interoperability with passive system; and, phone interface drivers for smart devices—this software and/or driver component is installed and runs on the phone, and simulates a passive system phone connector protocol, and therefore, allows any type of smart phone to interoperate with passive system 102 (e.g., cradled, tethered, wireless, etc.).

The storage interface abstracts the complexity of different types of storage from the passive system core 202. For example, the storage interface is compatible with the following type of storage systems: MMC (multi-media Card), CF (compact flash), SD/MiniSD/MicroSD (secure digital), and USB mass storage (or any other storage device that can support a USB connection).

The display interface abstracts the complexity of different type of displays from the passive system core 202. Examples of display interfaces for displays include RCA composite, VGA (video graphics array), S-video, DVI (digital visual interface), HDMI (high-definition multimedia interface), and e-paper display. The display interface can allow multiple types of displays to be connected concurrently to the passive system 102 and the phone/PDA 206 at the same time. These display devices can also have different screen resolutions. The passive system 102 can query the displays and collect information about display specification and capabilities, and hand off this information to the phone/PDA 206 connected at the time.

The network interface abstracts the complexity of different types of network connections from the passive system core 202. Example types of inter-device communications include, but are not limited to, infrared (e.g., IrDA), Bluetooth, Wi-Fi, USB, Wireless USB, Ethernet, and WiMax.

In one implementation, the interfaces are pluggable such that the passive system 102 can be used internationally by simply replacing one interface with another suitable for the geographic location in which the passive system 102 is being used.

Given the wide variety of connections, the passive system 102 has the capability to connect to a large number of smart phones and/or portable devices. Moreover, the passive system 102 can charge the phone and power the peripherals and smart device.

The smart device, represented here as the phone/PDA 206, and/or other suitable devices, can install application/driver software 208 that handles the tasks associated with simulating a computer interface for the external systems. The application and driver 208 can be installed on many different devices (e.g., phones) that have suitable hardware support for connecting to the peripherals. The application/driver 208 also has the capability of querying the phone/PDA 206 and/or other smart devices in order to self-configure to match the capability of the external devices connected through the passive system 102.

The interfaces, as represented in FIG. 2, and which can be considered past of the external interface component 114 of FIG. 1, can be a combination of physical connector and/or software running on the smart device (e.g., phone). The software connects the functionality of the hardware with the computing power of the smart device. The connector software is sufficiently flexible to be easily integrated into many smart devices running different platform operating systems. The connector software can be installed on the smart device by original equipment manufacturers (OEMs) or by the end users to turn the smart device into a "smarter" device by enhancing the capability of connecting to many different peripherals and external systems. The connector software can also translate the protocol that the smart device is capable of "speaking" to the protocol that the hardware devices expect. Performing this realtime translation of the protocol allows, for example, a smart phone that can only understand a Compact Flash card interface, for example, to interact with a USB storage device, and so on.

The passive system 102 can facilitate cross-device synchronization and provisioning. Since multiple passive systems 102 can be connected to a network, the attached smart devices can easily communicate and share data. This data exchange can be used to provision the phone with new settings, data, and multimedia, for example.

The passive system 102 can use a data exchange connector (or interface) and the networking connector (interface) to connect the smart device to a backup service, backup data, and settings, for example. When a new smart device is then plugged into the passive system 102, this data can be provisioned back into the new smart device.

Additionally, the passive system 102 can handle events and interrupts from the connected external systems (e.g., peripheral devices 108) and pass the events and/or interrupts on to the smart device. These events can trigger state changes on the smart device and enable/disable different functionality therein. The typical primary events are associated with connecting and disconnecting activities. For example, a connection event of connecting the smart device to the passive system 102 can first trigger a change(s) in operational behavior of the smart device, sense that the smart device has connected to the passive system 102, and second, the event(s) trigger one or more of the different software subsystems on the smart device phone to wakeup, query the passive system 102, understand the type of attached peripherals, and the functions that can be performed.

Figure 3:
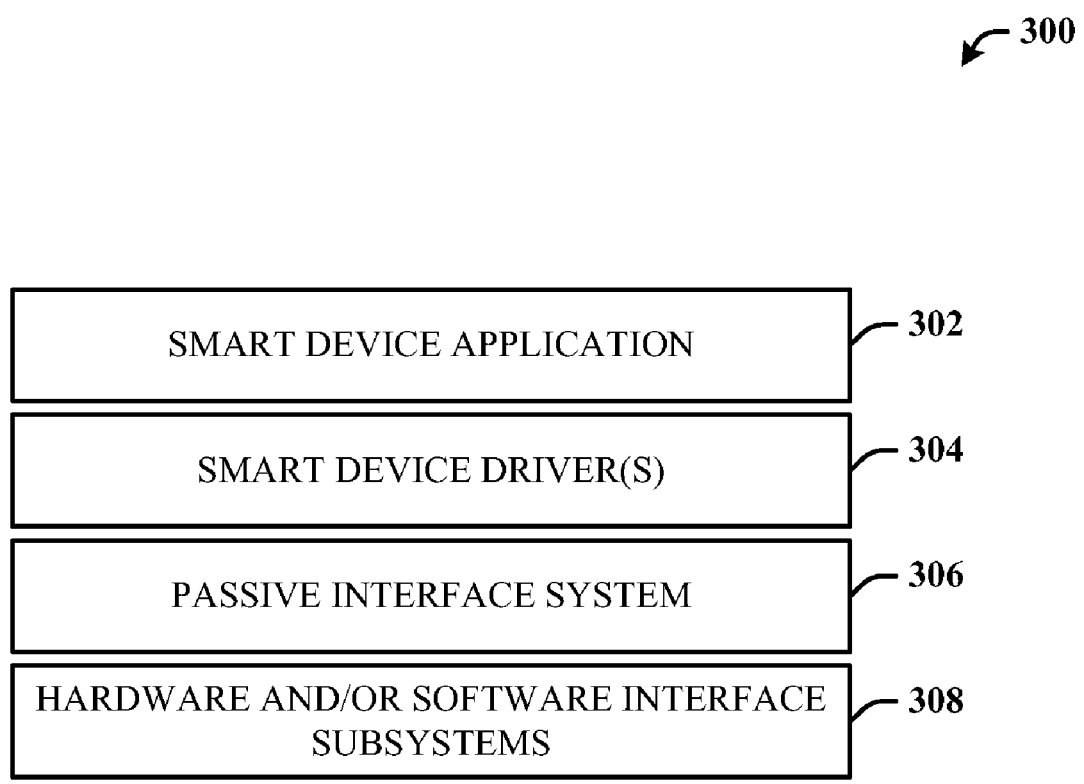
FIG. 3 illustrates a layered representation of components for the operability with the passive system and external systems exposed to the smart device via the passive system.

FIG. 3 illustrates provides a layered representation 300 of components for the operability with the passive system and external systems exposed to the smart device via the passive system. An application 302 installed on the smart device provides the higher level software for interacting between the smart device functionality and the passive system 102. The drivers 304 loaded into the smart device can include drivers for interacting with full functionality of the passive system 306 and the external systems that may be connected to the passive system. At the bottom layer 308 is the hardware and/or software associated with the passive system interacting with the external systems.

Figure 4:
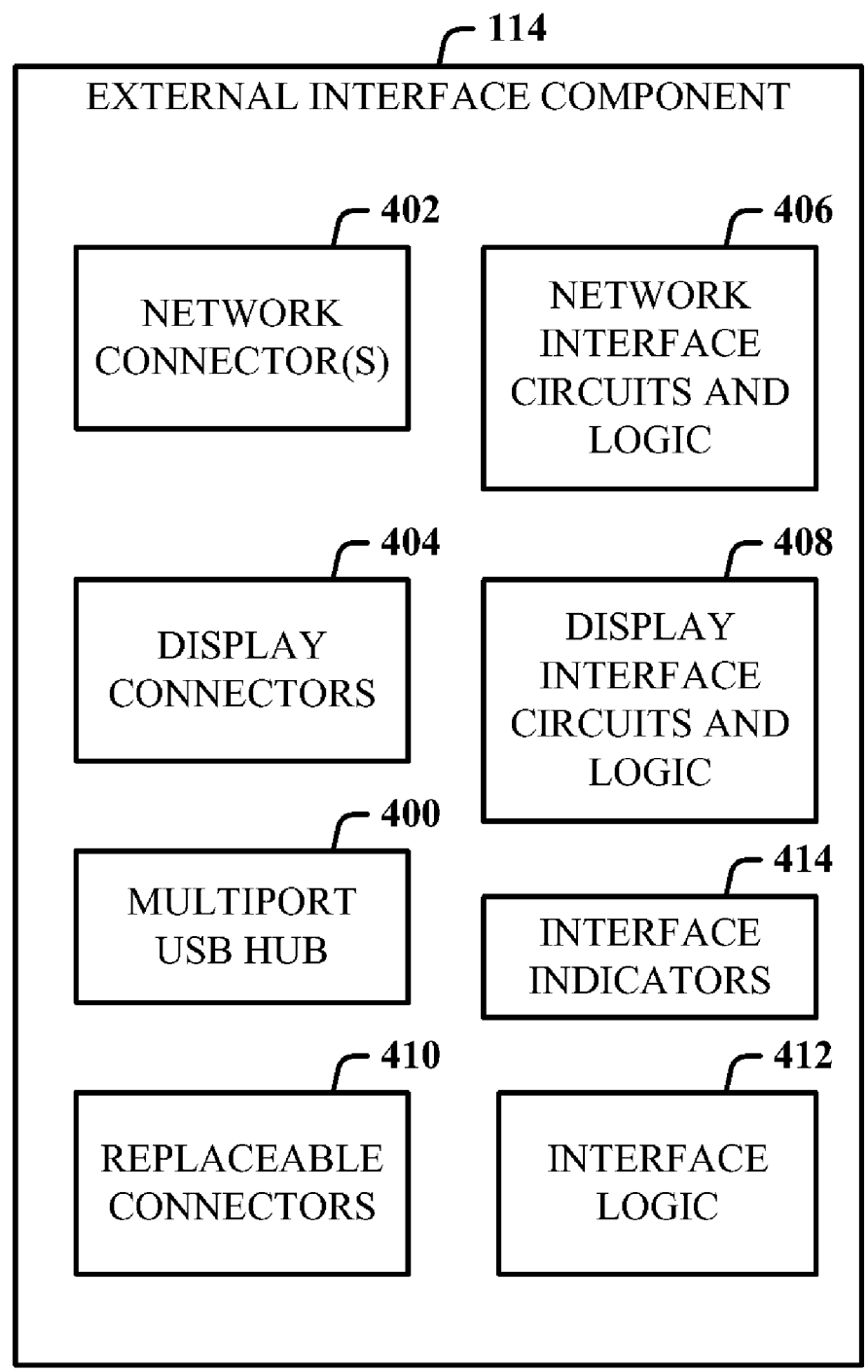
FIG. 4 illustrates a more detailed block diagram of the external interface component.

FIG. 4 illustrates a more detailed block diagram of the external interface component 114. The interface component 114 can include a basic default set of built-in connections and logic for commonly used peripheral devices and system interfaces. For example, a multiport USB hub 400 (e.g., three ports) can be included for interacting with a large number of USB devices in the market, one or more network connectors 402 (e.g., Ethernet) and one or more common display connectors 404 (e.g., VGA or USB and TV out). Other commonly-used connectors which can be employed include a parallel connector (e.g., for legacy systems) and audio connectors (e.g., for external audio systems).

Associated with this basic set of connectors can be associated interface circuits and logic. For example, network interface circuits and logic 406 can be used for providing the proper signal levels, timing, and data communications for the network connectors and associated network signals and data protocols for IP data traffic between the smart device and one or more IP network (e.g., the Internet) entities (e.g., websites, network printers, etc.), and a display interface circuits and logic 408 can be used for providing the proper signal levels and timing for the more common display types (e.g., LCD, VGA, etc.). The USB hub 400 can include the control logic for the proper signal levels and protocols used for USB devices as well as powered or unpowered management of USB devices.

Optionally, the interface component 114 (and passive system housing) can be designed to accommodate replaceable connectors 410 (for extra interface compatibility) that can be removed and replaced as needed. For example, if a particular peripheral device such as a cable TV box will only accommodate a special type connector, the vendor can supply a compatible connector type that is insertable into the smart system housing. In another example, if an additional USB port is needed, the replaceable connectors 410 can accommodate this by installing a removable USB add-on port. Additional interface logic 412 can then be employed to accommodate these specialty add-ons (e.g., IEEE 1394 port). The external interface component 114 can also include interface indicators such as LEDs to provide status information to the user, for example.

Figure 5:
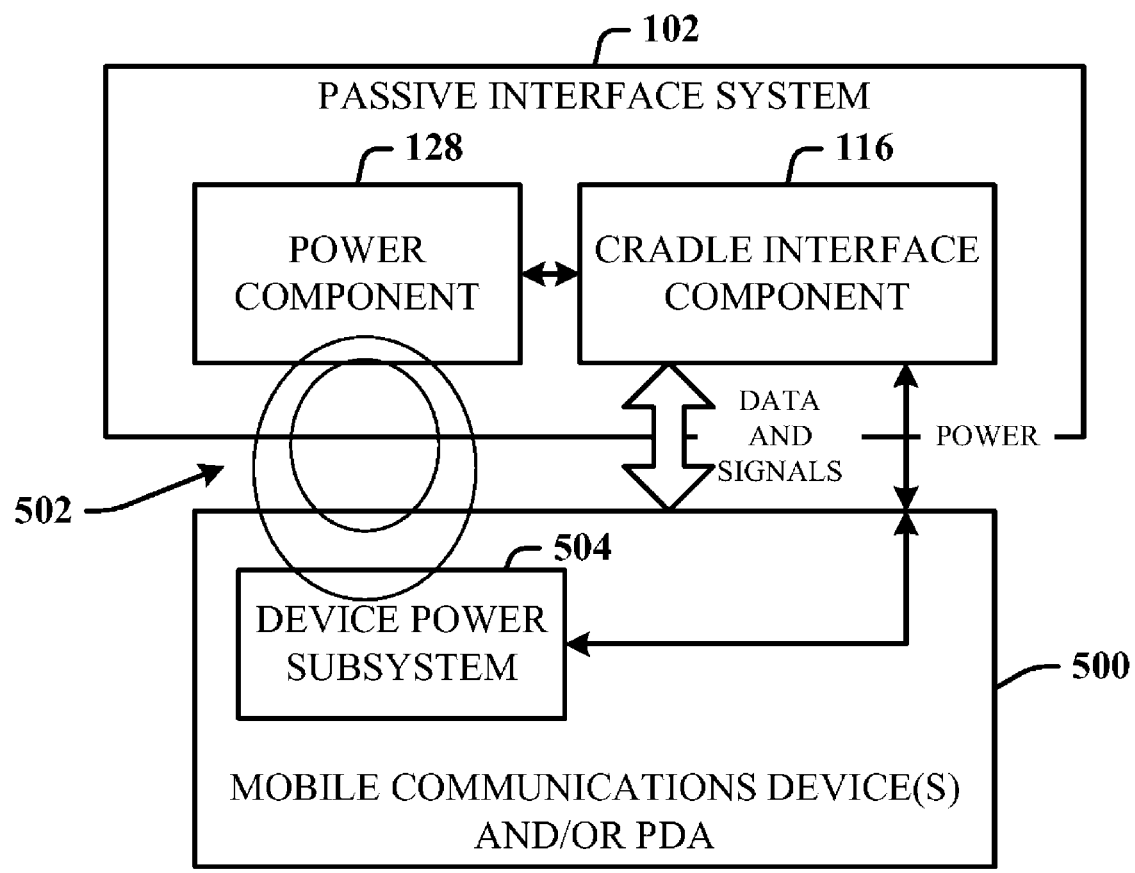
FIG. 5 illustrates a generalized cradle and mobile communications device interface for power, data and signals.

FIG. 5 illustrates a generalized cradle and mobile communications device interface for power, data and signals. The cradle interface component 116 can be standardized to the extent that the interface component 116 will accommodate a large number and type of smart devices 500. Typically, the interface component 116 includes connections for data and signals, as well as for power. As previously indicated, the passive system 102 includes the power component 128 that can power the devices 500 through the cradle interface component 116 and/or couple power into the devices 500 via an induction field 502. Accordingly, a device power subsystem 504 for suitable devices 500 can receive external power through a wire connection of the cradle interface component 116 and/or inductive coupling directly from the power component 128 to the power subsystem 504.

Figure 6:
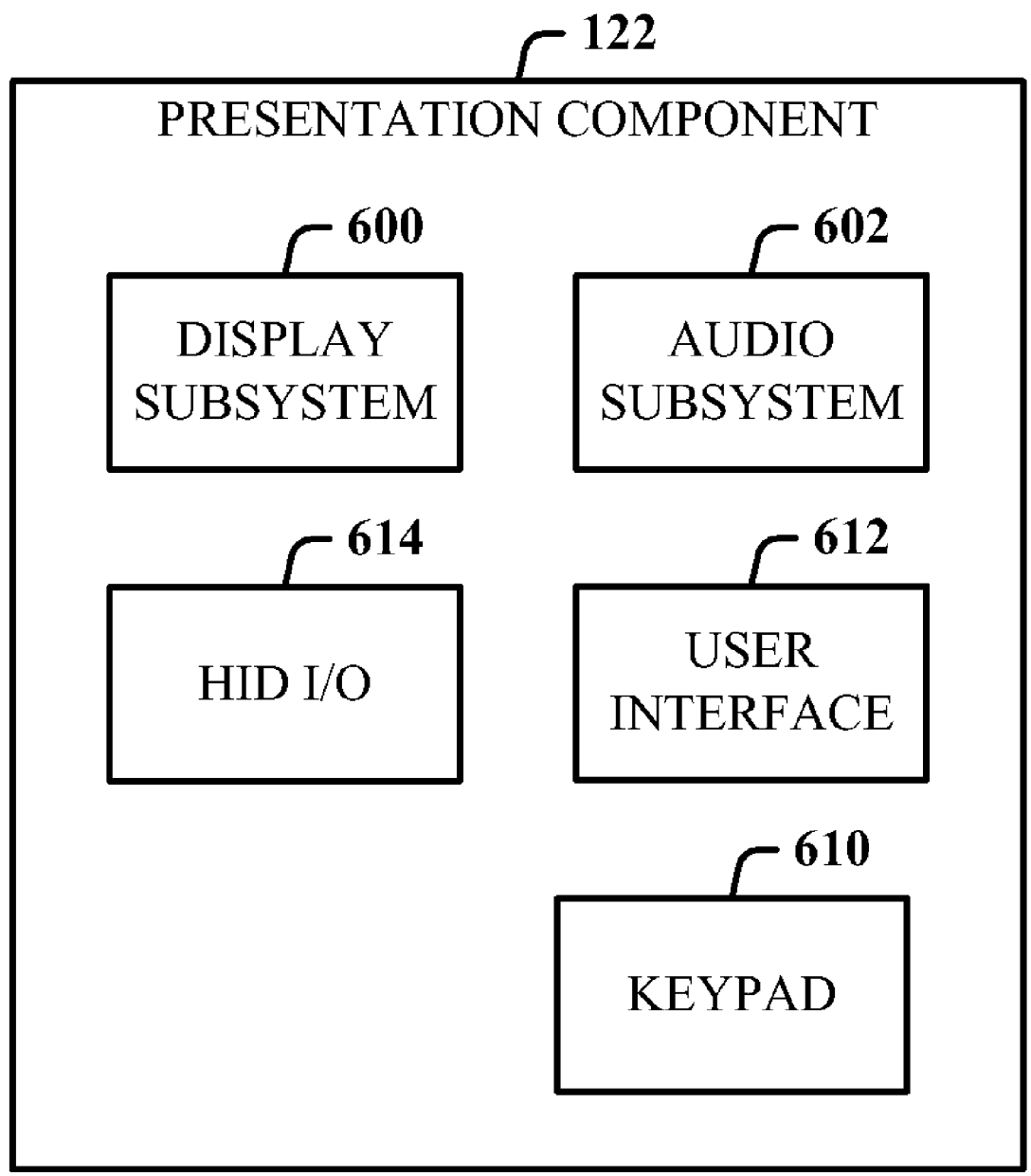
FIG. 6 illustrates a more detailed block diagram of the presentation component.

FIG. 6 illustrates a more detailed block diagram of the presentation component 122. The presentation component 122 includes support for the ways in which data and information can be presented via the passive system, as well as interacted with. A display subsystem 600 can include support for a display of the passive system. Auto-configuration can include not only the routing of display information from the smart device to an external display, when the passive system detects and connects to the smart device, but also associated with a possible change in behavior of the passive system display.

An audio subsystem 602 can be employed provides to provide fundamental beeps or tones relate operational state of the passive system. The audio subsystem can also facilitate the use of a microphone connected to the passive system. However, the voice input system of the smart device can be employed to process voices signals through the passive system to the external systems the use the voice signals. As previously indicated, the audio subsystem 602 can also include the audio connectors for connecting to external audio systems for the playing of audio files from the smart device.

Auto-configuration of the smart device by the installed application(s) and driver(s) can include not only the routing of audio output from the smart device to an external audio system (e.g., speakers, home system, computer speakers, etc.), when the passive system detects and connects to the smart device, but also associated with a possible change in behavior of the smart device audio system.

For example, once connected, audio signals of the smart device can be routed for output only by the external audio system. If the user receives a call when the smart device is in the cradle, the voice subsystem can be auto-configured to mute the external audio system so that other users can not hear the voice signals; otherwise, the call can be made public to all available users such as for conferencing.

The presentation component 122 can also include user input devices such as a keypad 510 for interacting with the passive system for setup, configuration, adjustment of settings during operation, and data input, for example, as well as interacting with a user interface 612. Other HIDs 614 for I/O can be connected to the passive system for use with the smart devices, passive system, and external systems such as keyboards, mice, touchpads, gesture systems, and so on.

Figure 7:
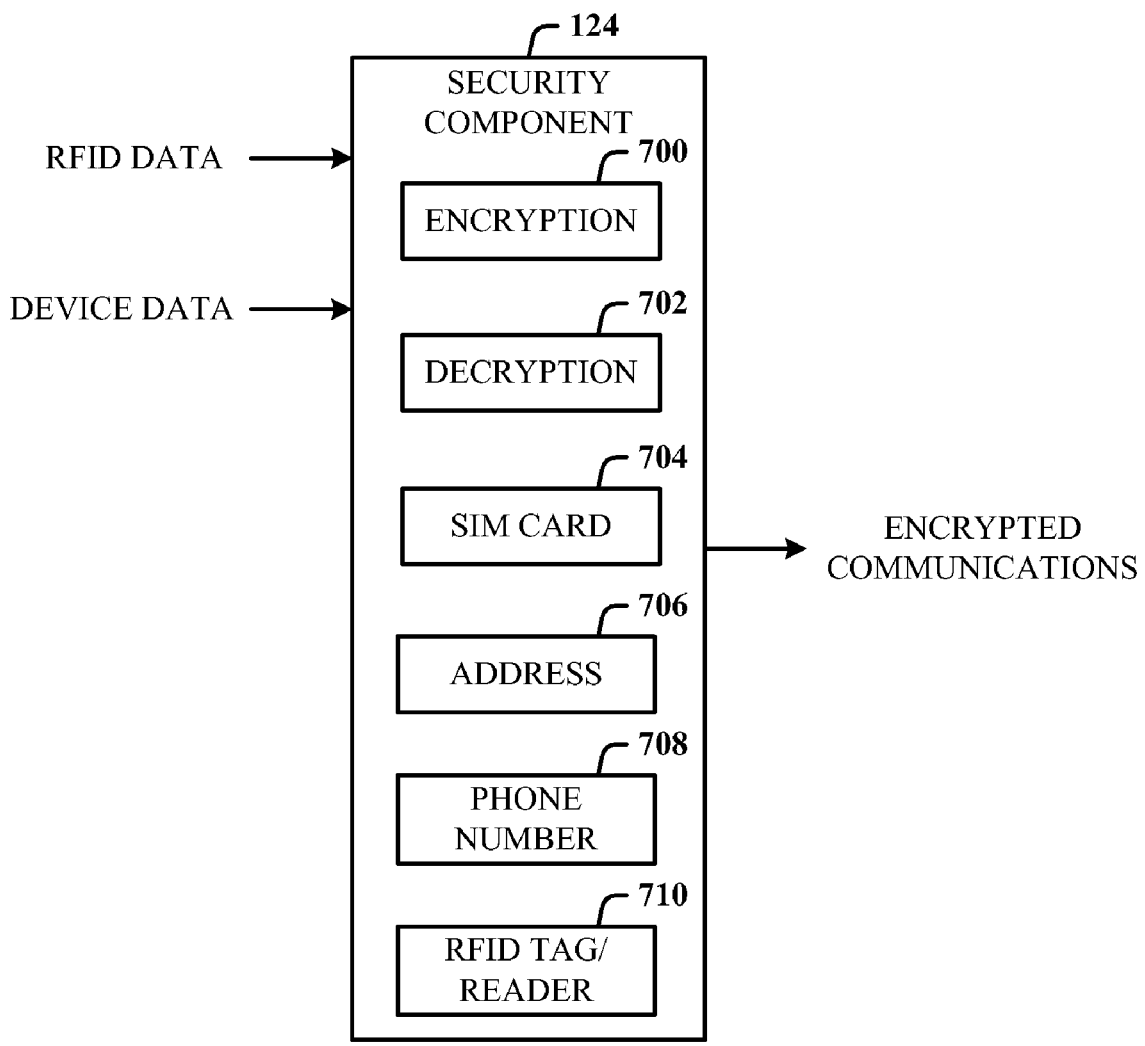
FIG. 7 illustrates more details of the security component for providing secure communications between the smart system and the mobile communications device.

FIG. 7 illustrates more details of the security component 124 for providing secure communications between the smart system and the mobile communications device. The security component 124 can include an encryption component 700 and a decryption component 602 for the corresponding encryption and decryption of data and/or signals using public and/or private key infrastructure.

Additionally, the security component 124 can include other information such as device data and/or passive system data that uniquely identifies the relationship between the device and the passive system. For example, a SIM (subscriber identity module) card 704 can be employed as part of the passive system. Similarly, the passive system can be assigned a unique address 706 (e.g., IP address) for network purposes. Additionally, the passive system can be assigned a phone number 708 for calling into the passive system. In other words, a user can call into a cradled smart device and/or the passive system. The SIM card 704, address 706 and phone number 708 allows the user to remotely access the services that are provided by the passive system.

As previously indicated, RFID technology can be employed such that RFID data is used as a means for encrypting and decrypting data and signals. Accordingly, an RFID tag/reader subsystem 710 can be employed. More specifically, the passive system can employ an RFID tag. A smart device (e.g., PDA, mobile communications device, game controller, etc.) can then include an RFID reader that activates the tag to read data stored therein. The data can include code for encrypting communications between the passive system and the smart device. Alternatively, the passive system can include the RFID reader such that when the smart device is brought into radio range, the RFID tag of the smart device is read to establish secure communications.

Figure 8:
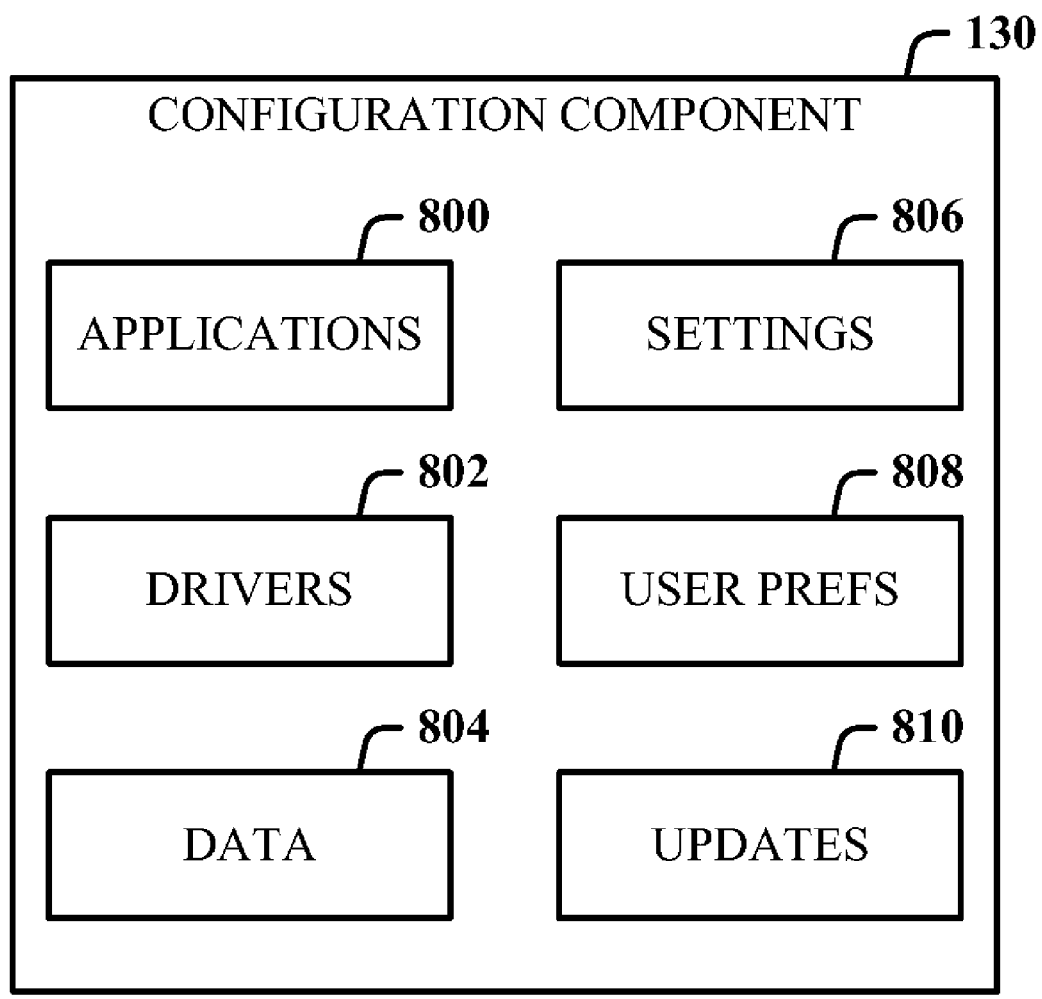
FIG. 8 illustrates details associated with the configuration component of the smart device.

FIG. 8 illustrates details associated with the configuration component 130 of the smart device. The configuration component 130 programs, drivers, and/or data can include applications 800 (e.g., audio, video, imaging, text messaging, document creation, browser, email, etc.), and drivers 802 for interfacing to functionality of the smart device and external systems as well as passive system components and subsystems. Data 804 can also be generated and stored in the memory of the smart device, including but not limited to events related to passive system use, for example. Settings 806 for the passive system, connected external systems and the smart device can also be generated and stored in the smart device. User preferences 808 for interacting with the passive system and external systems (e.g., a display) can also be generated and stored. Updates 810 for passive system components and subsystems can also be part of the configuration component 130. Updates can be performed by the passive system, if utilized, and for the smart device.

Figure 9:
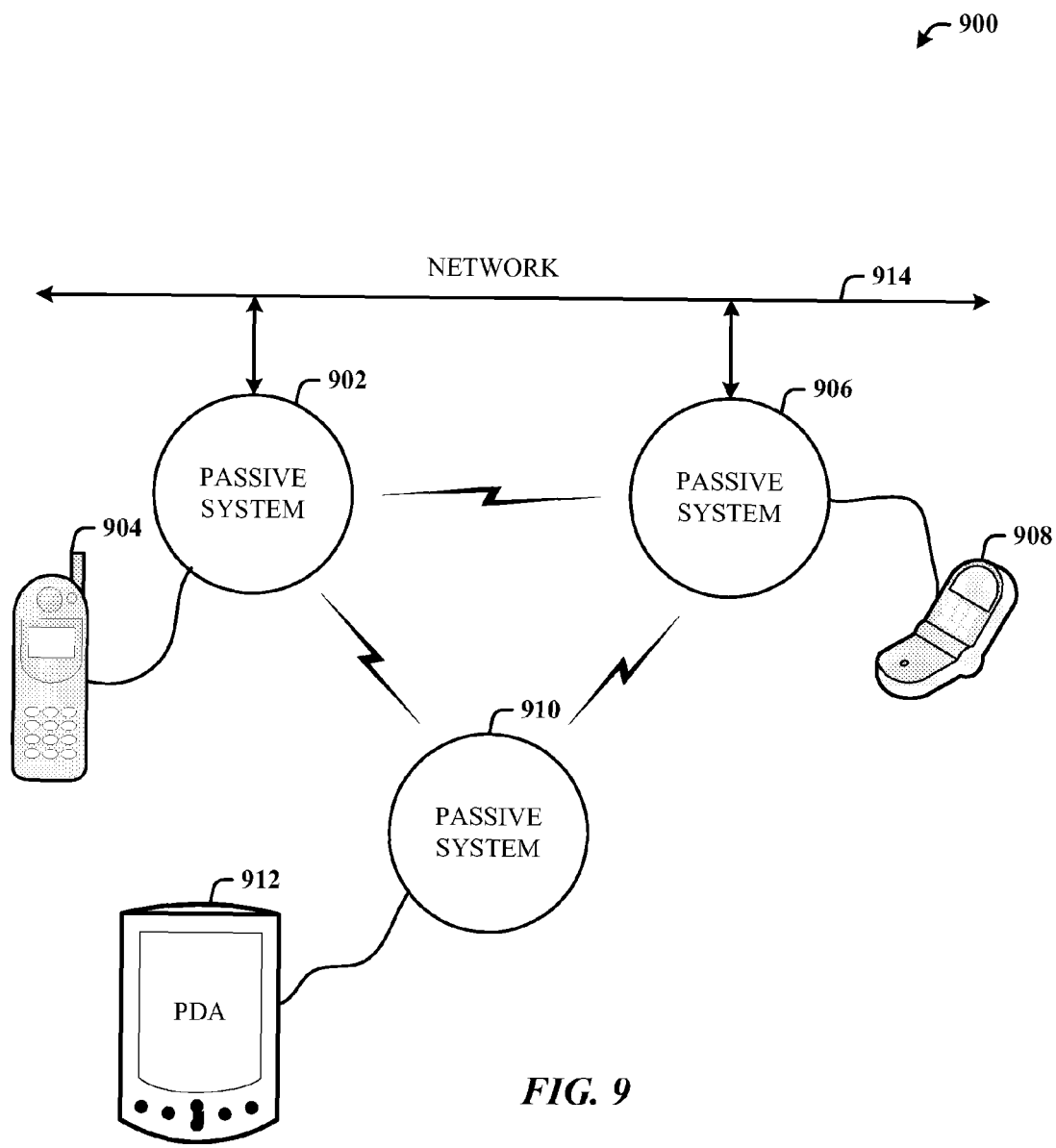
FIG. 9 illustrates a system where multiple passive systems can be employed for network access and communications between smart devices.

FIG. 9 illustrates a system 900 where multiple passive systems can be employed for network access and communications between smart devices. Here, three passive systems are employed: a first passive system 902 with a tethered first cell phone 904, a second passive system 906 with a tethered second cell phone 908, and a third passive system 910 with a tethered PDA 912. The first and second passive systems (902 and 906) communicate directly with a network 914. The third passive system 910 can communicate indirectly to the network 914 wirelessly through either or both of the first passive system 902 or/and the second passive system 906. Moreover, the first and second passive (902 and 906) can communicate (e.g., Bluetooth) with each other through the network 914 and/or wirelessly.

The data connection capability of the passive system allows for exchanging data between different smart devices connected and external systems connected to the passive systems. This data pipeline can be used to synchronize content and settings and provisioning of the smart devices with media, contacts, and carrier (e.g., cell phone) subscriptions, for example. Additionally, the data connection capability allows the phones (904 and 908) and PDA 912 to be connected to other sources of data and media such as gaming systems (e.g., Xbox™) or other gaming and media storage devices. In another example, a game controller, MP3 player and/or MP4 player can be connected to the passive system rather than the smart devices, or in combination therewith. Moreover, this allows the phones (904 and 908) and PDA 912 to be automatically provisioned with the users preferred songs that are stored on the user's computer or gaming system, the contacts that are stored on the user's computer, and the settings for the phones (904 and 908) and PDA 912 that are stored on the network.

Additionally, the data exchange capability can be used to exchange and share data and media between two different smart devices (e.g., phone 904 and phone 908), or the phone 904 and the PDA 912, for example. If there are multiple interconnected passive systems in a home or business, and the passive systems can provide a conduit to exchange data between different phones and other systems. Alternatively, the passive system 902 can synchronize content from the first phone 904 and store the content in a peripheral memory (e.g., flash device), and then transfer that content to the second phone 908 when the second phone 908 connects (e.g., cradled) in the second passive system 906 or tethers to the first passive system 902.

The data sharing and/or exchange can be according to an ad hoc peer-to-peer (P2P) network arrangement, such as a smart device (e.g., phone 908) and a computing system (e.g., user laptop or desktop). In other words, the passive system 910 can be deployed in a setting (e.g., coffee shop, conference room, etc.) where user devices can connect wirelessly to each other as peers via the passive system 910.

Figure 10:
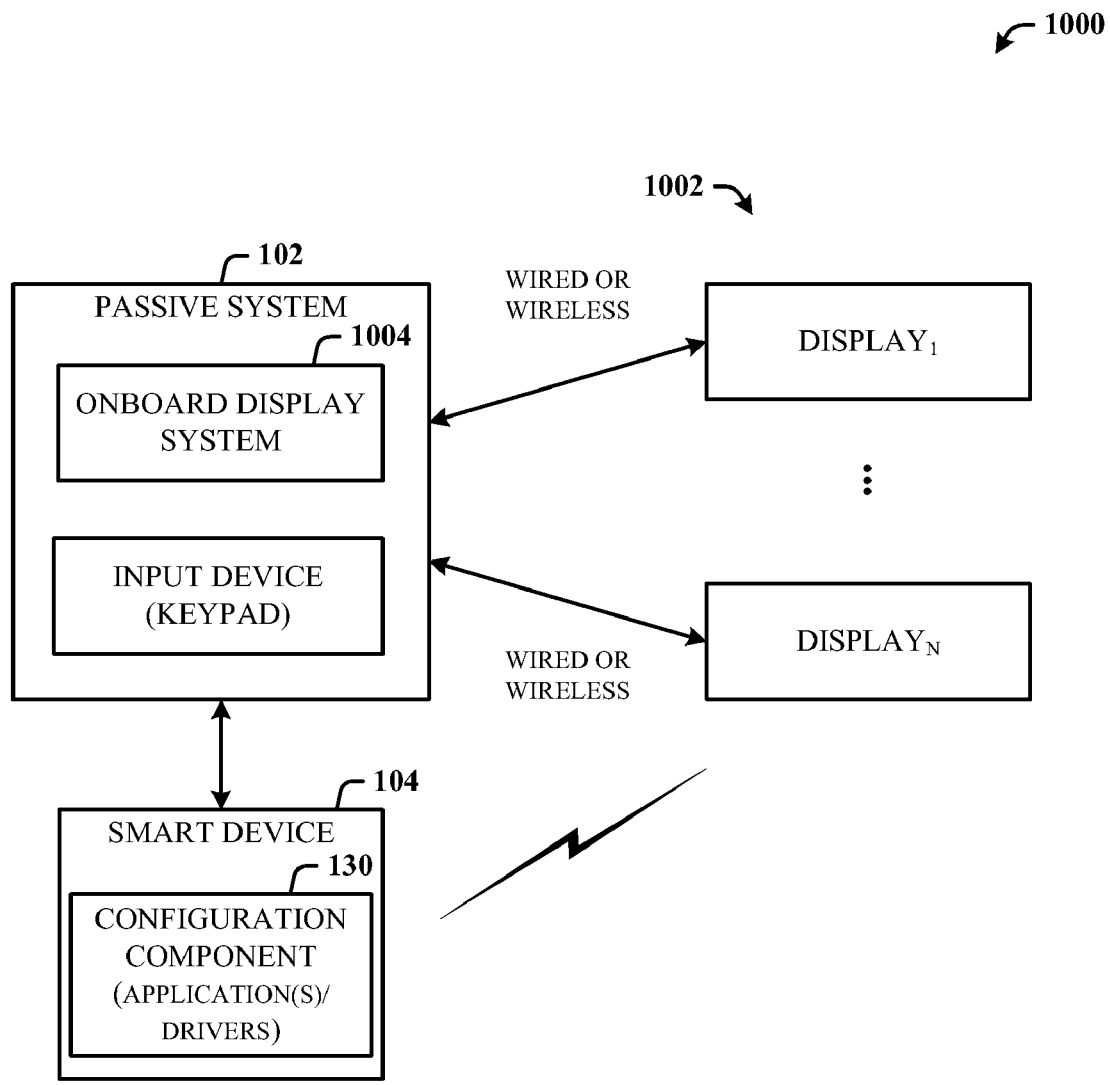
FIG. 10 illustrates a system for the use of auxiliary displays via the passive system.

FIG. 10 illustrates a system 1000 for the use of auxiliary displays 1002 via the passive system 102. The passive system 102 provides the capability to connect one or more external displays 1002 for the smart device 104 (e.g., cell phone and/or PDA) and facilitates display management in the following ways. The configuration component 130 provides functionality to communicate with the passive system 102, auto-detect the one or more large displays 1002, if the displays 1002 (e.g., televisions) are connected, and recognize the display characteristics (e.g., resolution, size, etc.) for displaying information efficiently and appropriately on the one or more large displays 1002.

Additionally, the configuration component 130 includes functionality for auto-detecting the first time use and walk-through of the user through a series of steps to configure the external systems (e.g., the one or more large displays 1002) and the smart device 104. The configuration component 130 can also display help and training media (e.g., voice, video) for configuring one or more of the large displays 1002 and small display of the smart device 104, concurrently or separately, to guide the user to through passive system and external systems setup, and for learning the capabilities of the passive system and connected systems.

The configuration component 130 also provides the functionality to detect the screen size, resolution, orientation of both the smart device display and the peripheral display for automatically suggesting setting on the large display, based on the smart device display. Additionally, previous user preferences can be employed to save and then automatically adjust the content presented on the screen and use appropriate size, resolution and fonts, for example, to optimize use of the available screen space.

The configuration component 130 supports the ability to remember the user preferences related to, for example, content control (content that should or should not be displayed), large display capability such as size, resolution and orientation, output signal type such as PAL (phase alternating line) or NTSC (national television system committee), and color compensation for the large display based on ambient light.

The configuration component 130 also serves as the mechanism for switching the screen resolution and size and orientation, and serves up the communication steps and protocols to inform a user of the screen changes. The configuration component 130 provides the functionality to automatically detect the most optimal display(s) to use, to display phone applications fully on the large display(s), partially on the large display(s), the passive system display, and/or the smart device display, and to detect the audio capability of the large display(s) and when audio should be routed to the large display(s) for presentation via display speakers for example, or other peripheral audio systems.

A passive system 102 can be connected to the one or many large displays 1002 through a wired and/or wireless link. The wired and/or wireless link capability can be embedded into the passive system 102, an add-on device to the passive system 102, or as one of the external systems; however, the functionality remains the same. That is, the passive system 102 can either be physically connected to the large display or connected wirelessly.

When the passive system 102 connects to a large display (e.g., a TV), for example, the passive system display 1004 (e.g., as part of the presentation component 122) can be used to present a set of options and information to guide the user to correctly connect the smart device to the large display.

As previously indicated, the configuration component 130 can be employed to store settings in user profiles that are selectable for a given environment (e.g., home or office). As a result of the settings and profile information, external systems connecting to the passive system 102 can be detected at some level. Thus, by detecting one or more of the externals systems (e.g., a cluster) connected, the passive system 102 can automatically select the user profile to employ. For example, if a keyboard, mouse, and TV are detected as connected, the configuration component 130 infer that the user is at home, thereby selecting a home profile that auto-configures the TV for user viewing.

Alternatively, if an input device to the passive system 102 is a touchpad or gesture device and a smaller display, the configuration component 130 can infer that the user is on travel or at the office using a laptop, and hence, a suitable profile can be selected and executed to provided the settings and configuration associated with that profile and environment. Additionally, a different profile can then be selected and employed that configures the passive system display for a particular view setting.

When the smart device is connected to a large display such as a TV a screen via the passive system, a set of options and information in the form of a wizard, for example, to guide the user to correctly connect the device can be presented to the large screen display from the smart device. The wizard can incorporate the following steps:

Inform the user that a large screen was detected and present a choice to the user to configure the device to work with this new display or quit the process;

The user is presented with information in form of text, voice, and/or video on the smart device as to how the user should respond;

The user can be prompted to turn on the TV or large display and search for a specific pattern of text, image, or find a specific video or sound. This helps the user identify the right channel;

Further instructions and information can be displayed on the large display to educate the user about how the smart device is used and give the user further instructions;

The user can be prompted to identify the best image from a set of test images on the large display and the settings that the smart device will push to the large screen display. This helps the smart device to fully understand the range of the capabilities of the large screen display; and The user can be informed that the setup and configuration of the larger screen display is complete.

Note that the above description for detecting, setup and configuration for a larger display can be accomplished by direct connection or communication between the smart device 104 and one of the external displays 1002. In other words, the passive system 102 is not required to obtain the functionality described above. The wizard, for example, can be launched based on direct connection (wire or wireless) of the smart device 104 to the larger external display. The wizard functionality can then be displayed either on the smart device display, the larger display, or both. This applies to direct connection to other external peripherals, as well. However, in the instance of an external printer, for example, the smart device display may be the only means for presenting setup and configuration information; however, printers that do incorporate a display for setup and status information, which can then be used as well.

The following example is in the context of a TV; however, the wizard can be adapted for use with many external system setup and configuration procedures. FIGS. 10-15 illustrate a series of exemplary wizard panels for setup and configuration of a TV, which can be presented on the TV, when connected to a smart device through the passive system.

Figure 11:
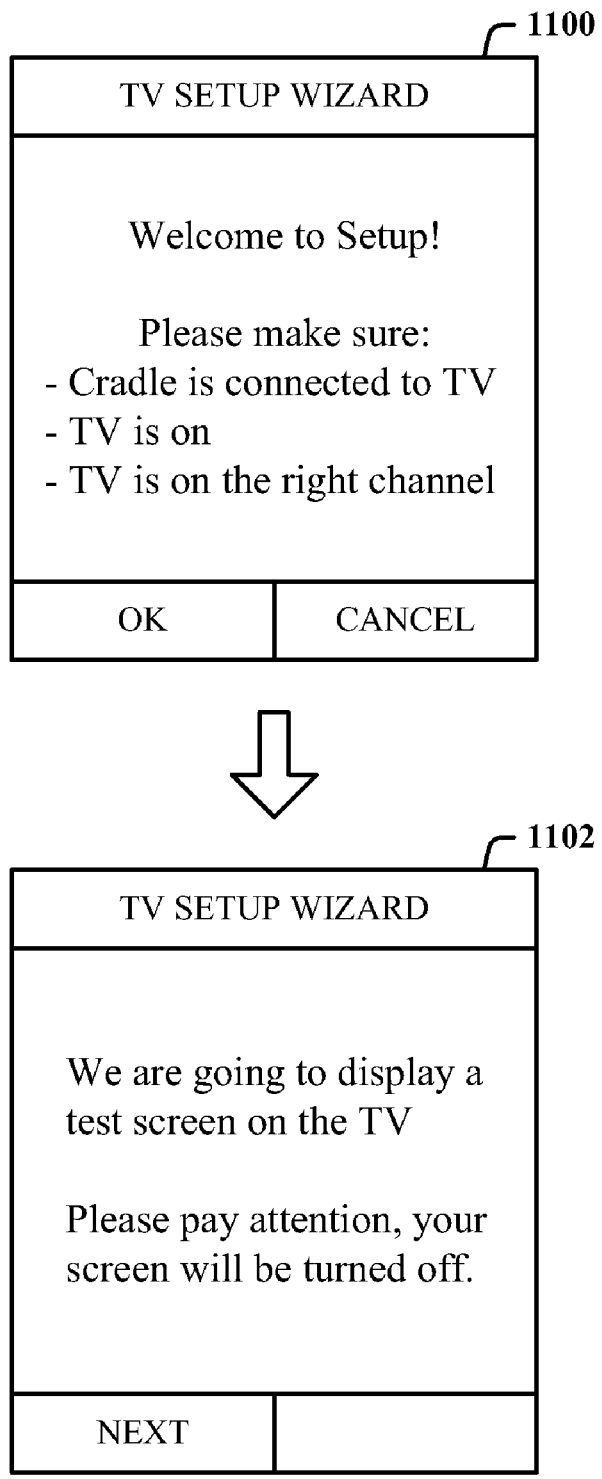
FIG. 11 illustrates an exemplary welcome panel and a test explanation panel for a test mode.

FIG. 11 illustrates an exemplary welcome first panel 1100 and a test explanation panel 1102 for a test mode. The wizard can be started manually after the user connects the smart device (e.g., a cell phone) to the passive system. Alternatively, the wizard can be launched automatically in response to detection of a new external system being connected to the passive system. The first panel 1100 is a welcome screen that instructs the user to ensure that initial connections and settings have been made, such, ensure that the passive system (also referred to as the cradle) is connected to the device (a TV), the TV turned on, and tuned to the correct channel. Following the first panel 1100 is the second panel 1102 that explains to the user as to a test function that will be conducted (e.g., a test screen) and possible results.

Figure 12:
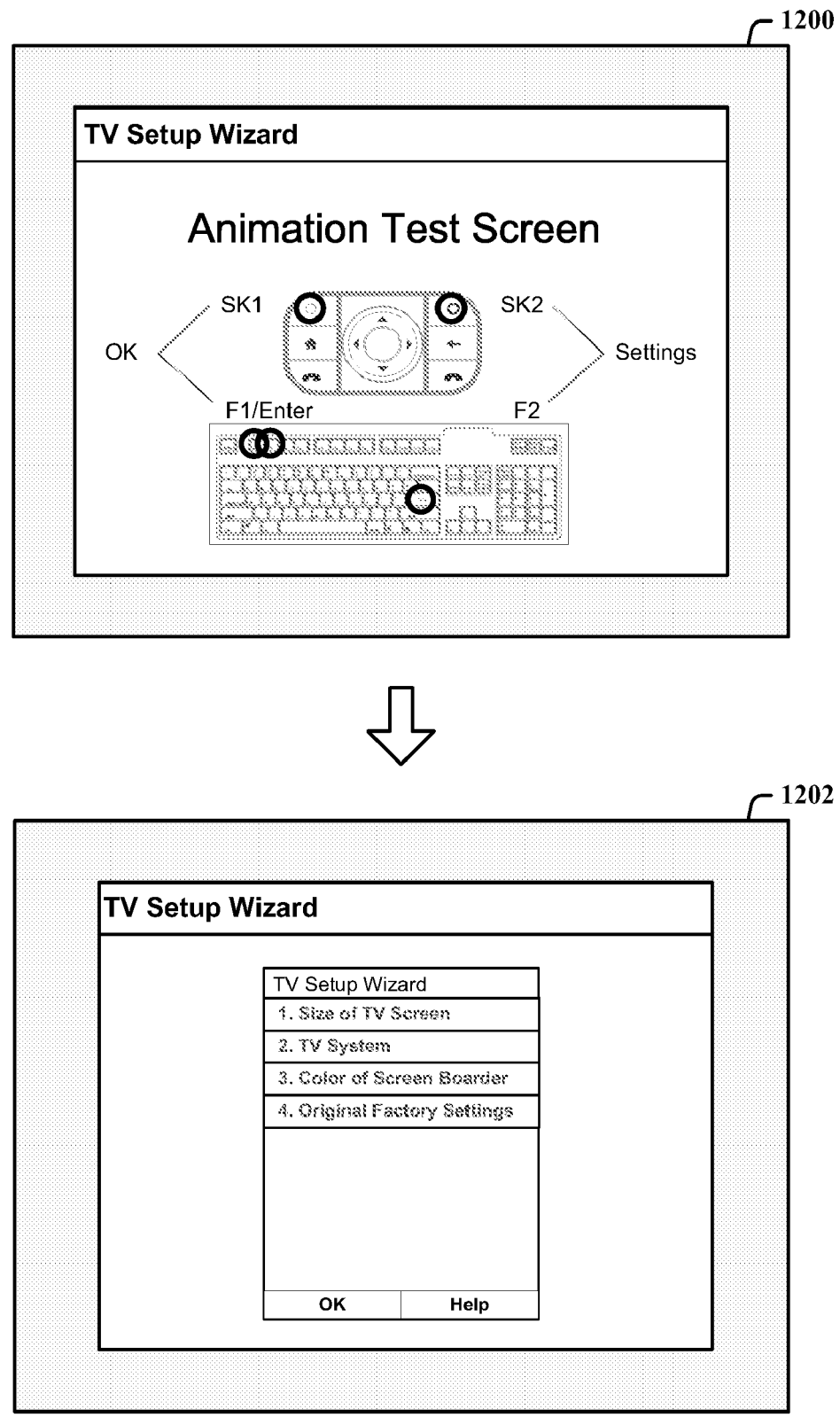
FIG. 12 illustrates an exemplary test panel and a settings detail panel presented as part of the setup wizard.

FIG. 12 illustrates an exemplary test panel 1200 and a settings detail panel 1202 presented as part of the setup wizard. The test panel 1200 can include animation to show the user what keys to press, what keys on the keyboard may translate to controls on a remote control, etc. The settings detail panel 1202 presents a list of settings that will be reviewed during the setup procedure.

Figure 13:
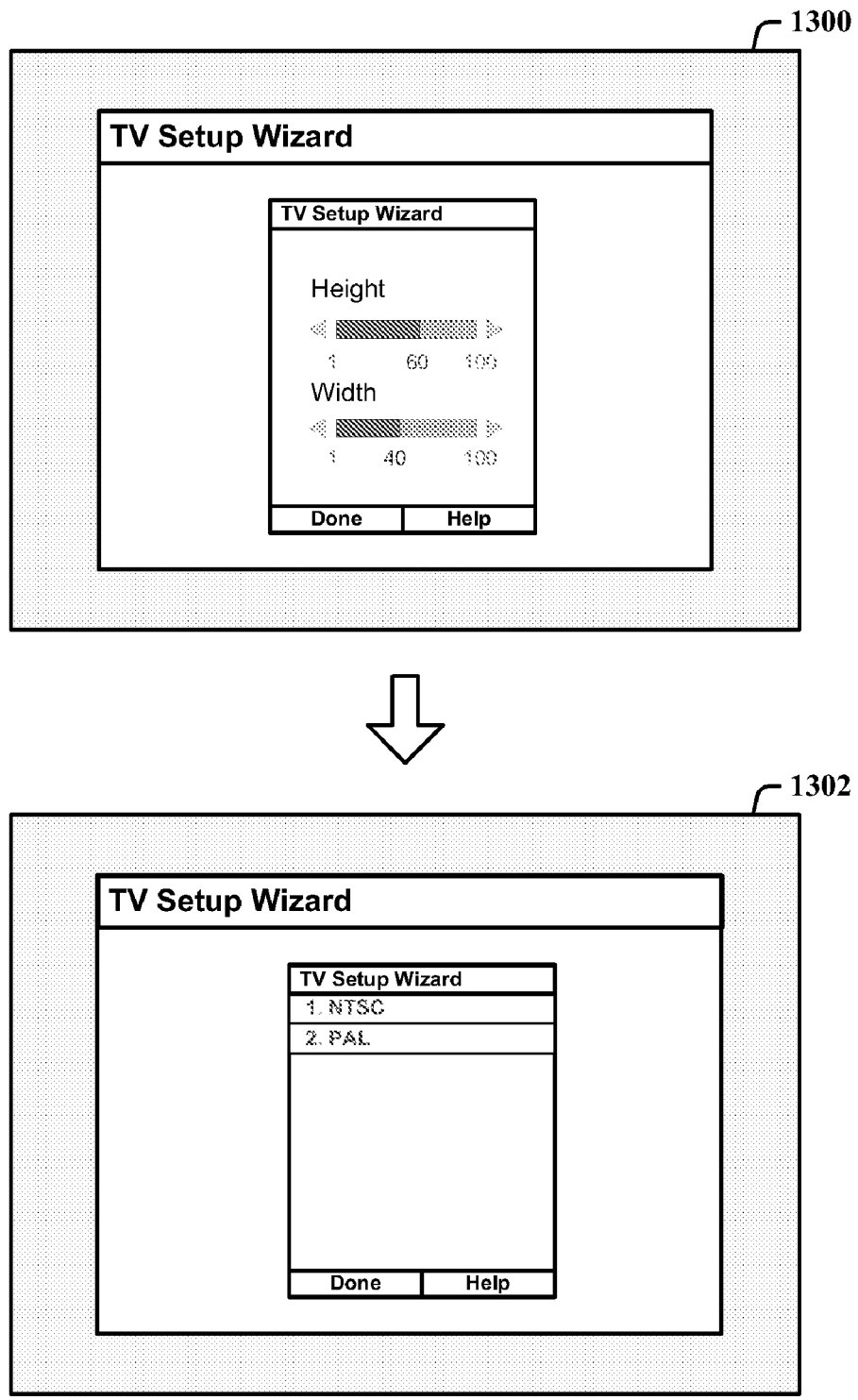
FIG. 13 illustrates an exemplary screen size adjustment panel and TV system panel presented to the user via a setup wizard.

FIG. 13 illustrates an exemplary screen size adjustment panel 1300 and TV system panel 1302 presented to the user via a setup wizard. Adjustment panel 1300 provides the user the ability to adjust the height and width of the screen presented on the TV. The TV system panel 1302 allows the user to select if the TV is a PAL system or an NTSC system.

Figure 14:
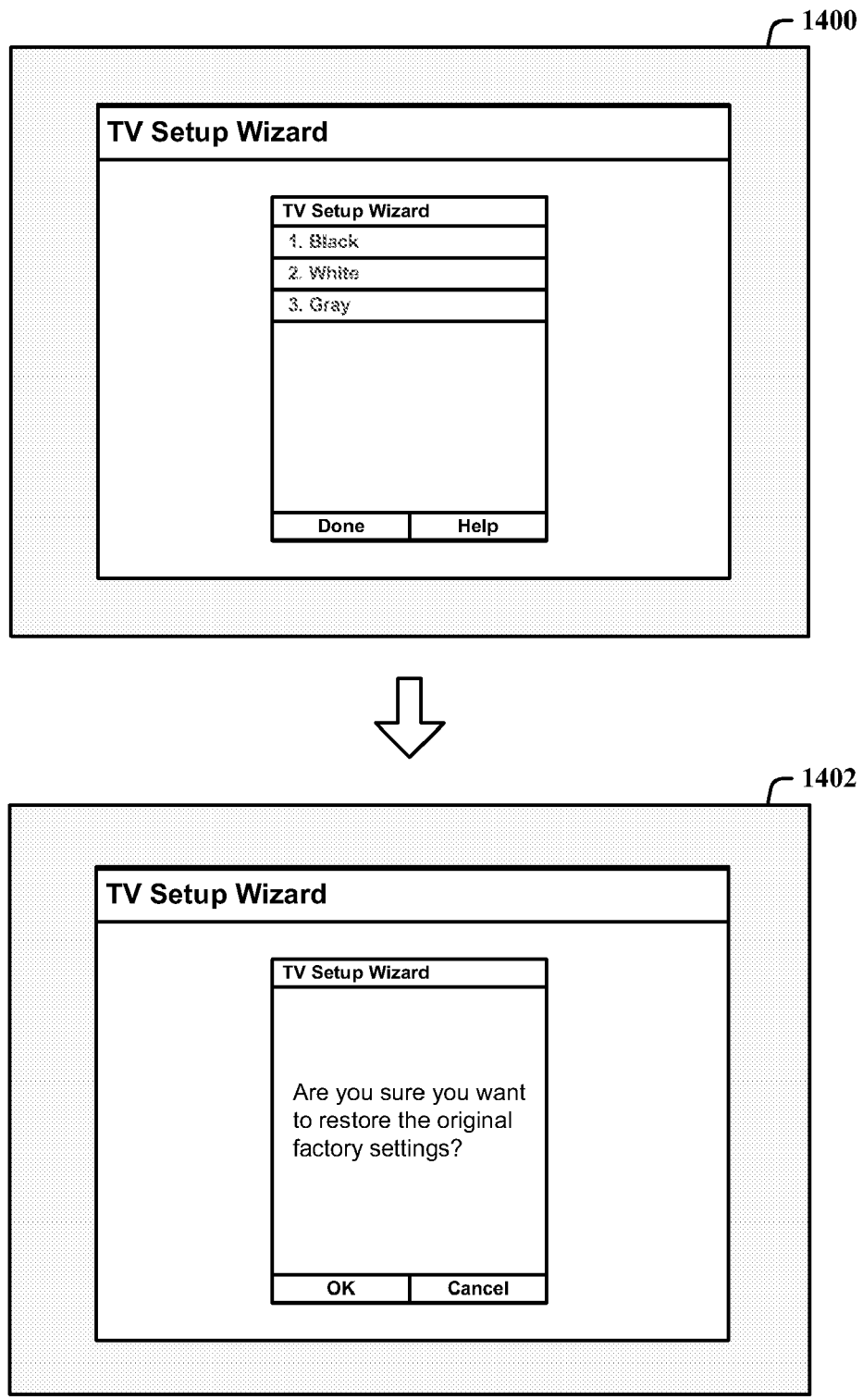
FIG. 14 illustrates an exemplary screen border color panel and option panel to reset the current settings to the factory settings using the setup wizard.

FIG. 14 illustrates an exemplary screen border color panel 1400 and option panel 1402 to reset the current settings to the factory settings using the setup wizard. Here, the border can be set to black, white or gray. The option panel 1402 allows the user to reset or cancel, to continue.

Figure 15:
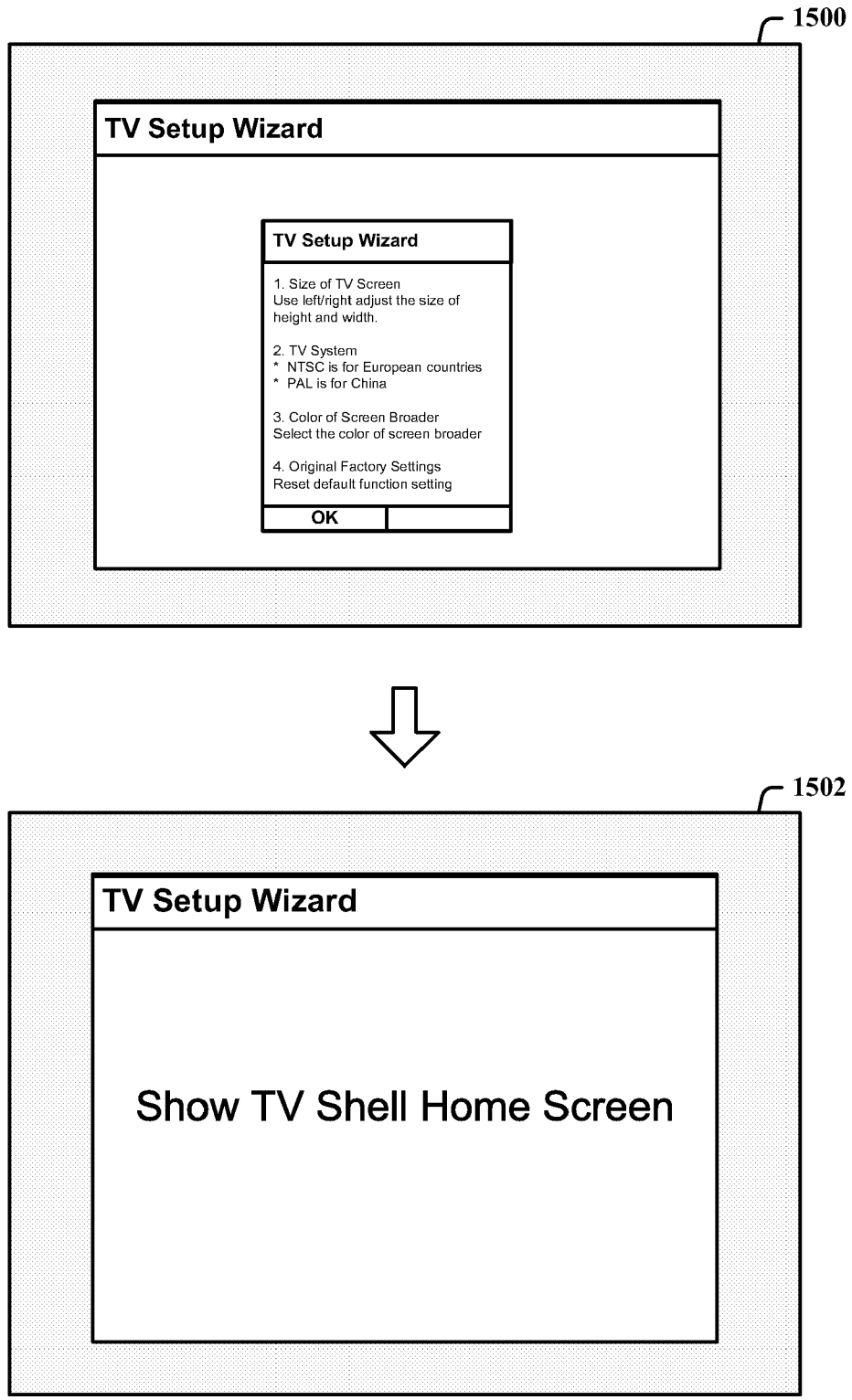
FIG. 15 illustrates exemplary additional details and shell home screen panel.

FIG. 15 illustrates an exemplary additional details 1500 and shell home screen panel 1502. The screen panel 1502 indicates to the user that the smart device will not be driving the TV. Once initiated a logo screen can be presented.

While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 16:
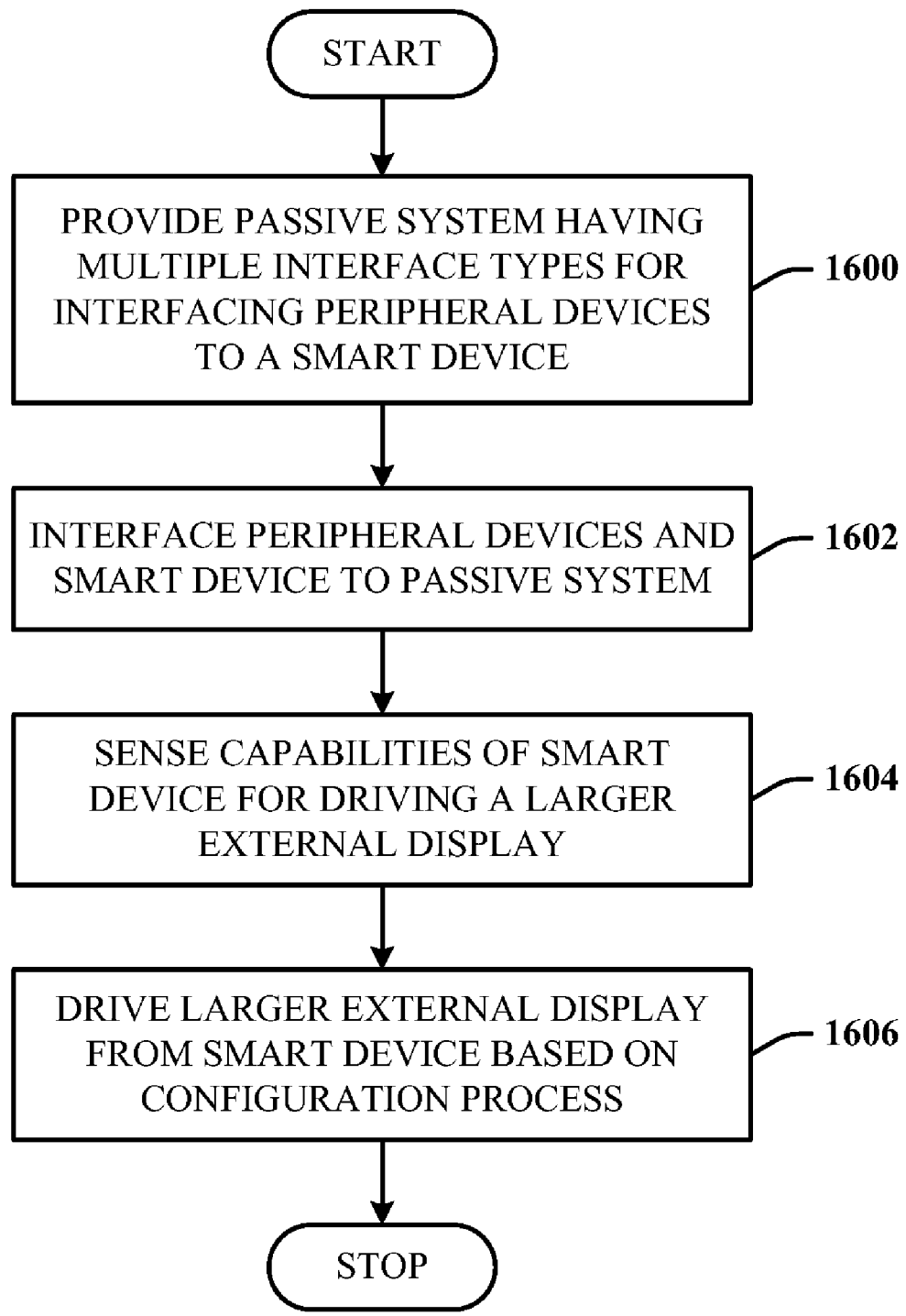
FIG. 16 illustrates a method of providing connectivity between a smart device and peripheral devices.

FIG. 16 illustrates a method of providing connectivity between a smart device and peripheral devices. At 1600, a passive system having multiple interface types for interfacing peripheral devices to a smart device is provided. At 1602, the peripheral devices and the smart device are interfaced to the passive system. At 1604, capabilities of the smart device for driving a larger external display are sensed. At 1606, the smart device drives the larger external display based on a configuration process.

Figure 17:
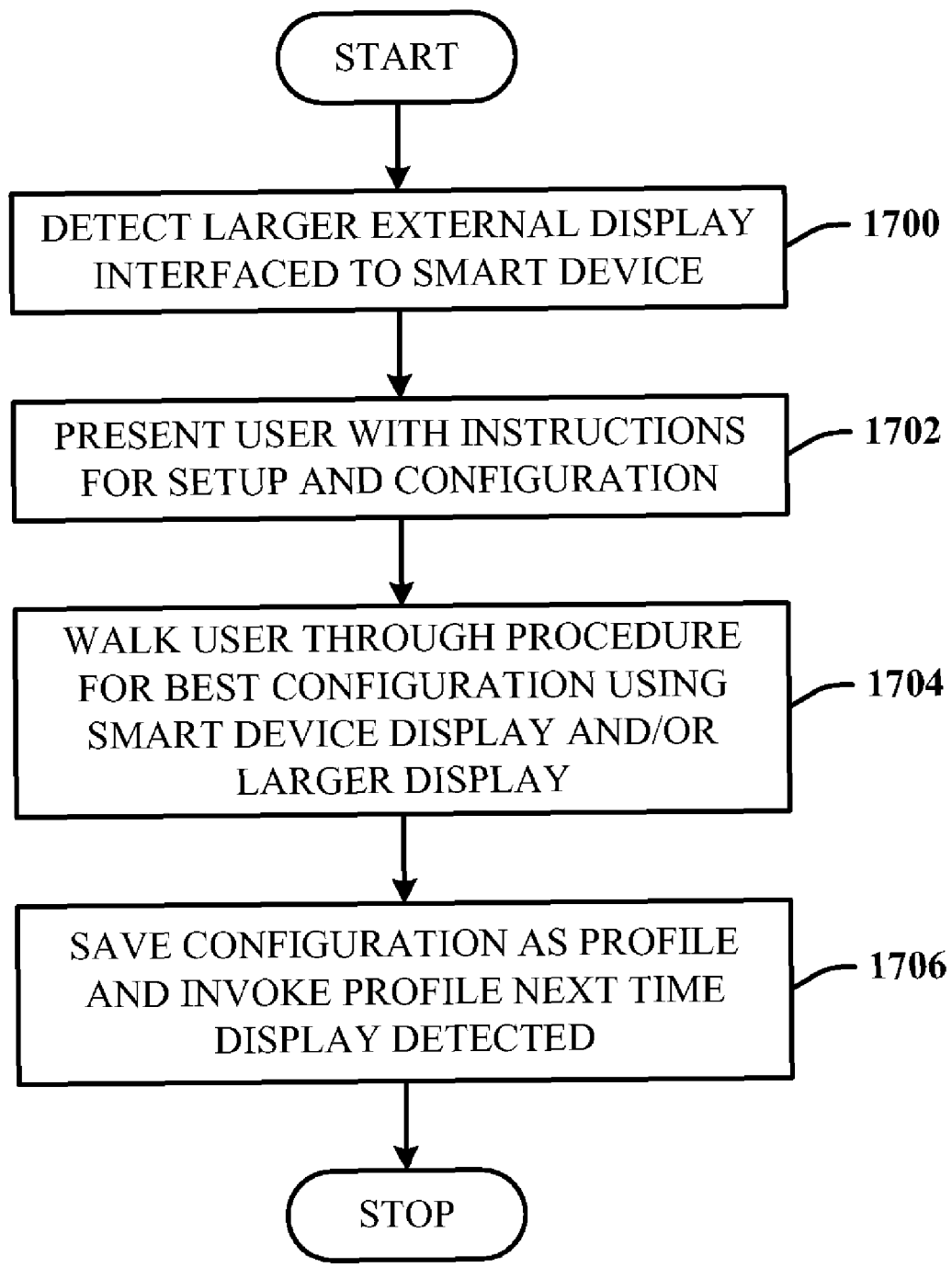
FIG. 17 illustrates a method of managing a detected larger external display interfaced to a smart device.

FIG. 17 illustrates a method of managing a detected larger external display interfaced to a smart device. At 1700, a larger external display is connected to the smart device and automatically detected. This can be by a direct physical (or tethered) connection to the smart device or by a wireless connection to the external display. At 1702, the user is presented with instructions for setup and configuration of the external display. Presentation can be via the smart device display and/or the external display. At 1704, based on the detection, the user is guided through a setup and configuration procedure using the smart device display and/or the external display. At 1706, the setup and configuration information is stored as a profile and invoked the next time the external display is detected.

Figure 18:
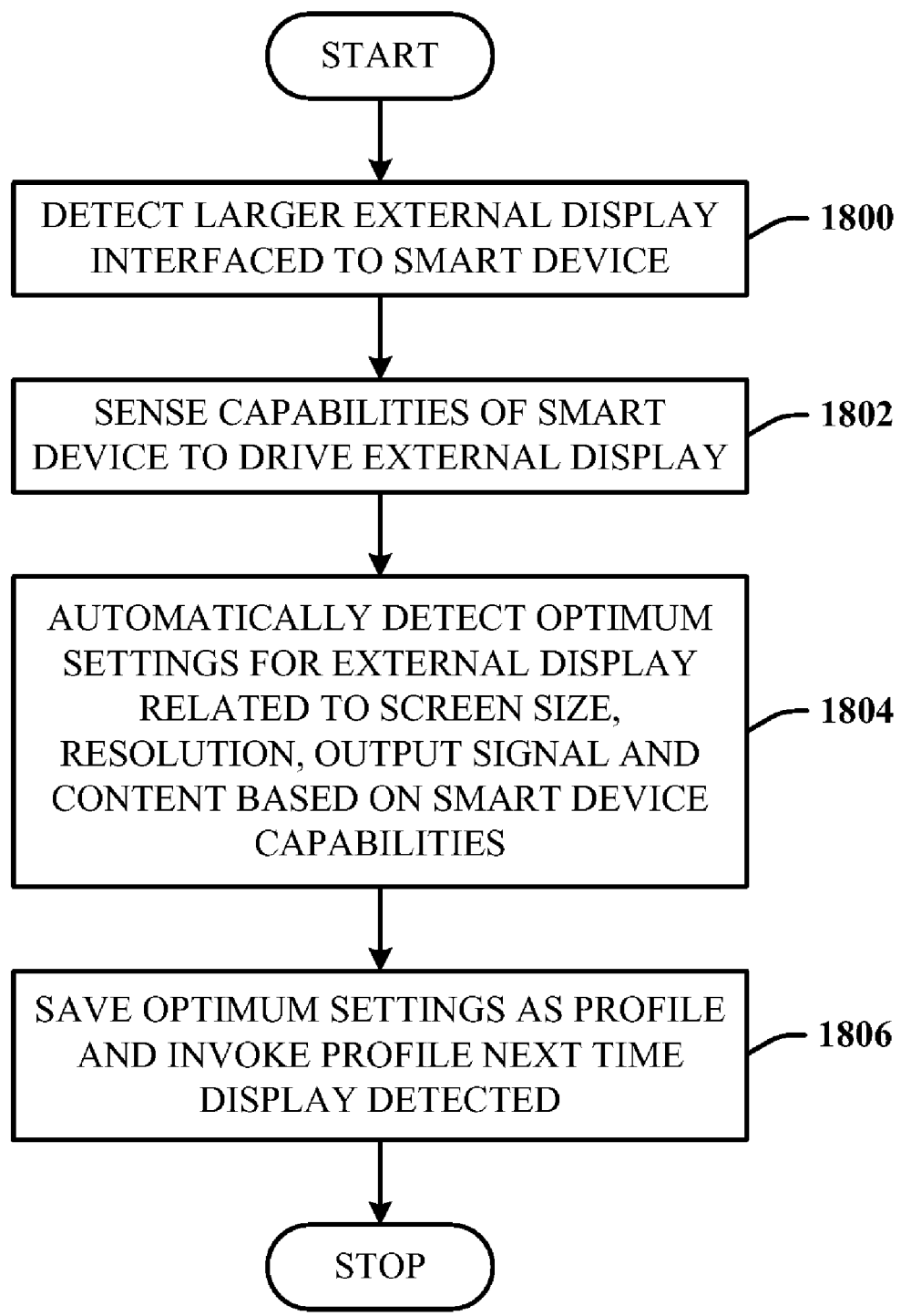
FIG. 18 illustrates a method of processing optimum settings for a detected larger display.

FIG. 18 illustrates a method of processing optimum settings for a detected larger display. At 1800, a larger external display interfaced to the smart device is detected. At 1802, the capabilities of the smart device are sensed to drive external display. At 1804, the optimum settings for the external display are automatically detected; the settings can be related to screen size, resolution, output signal and content based on the sensed smart device capabilities. At 1806, the optimum settings are saved as a profile and the profile is invoked next time the external display is detected.

Figure 19:
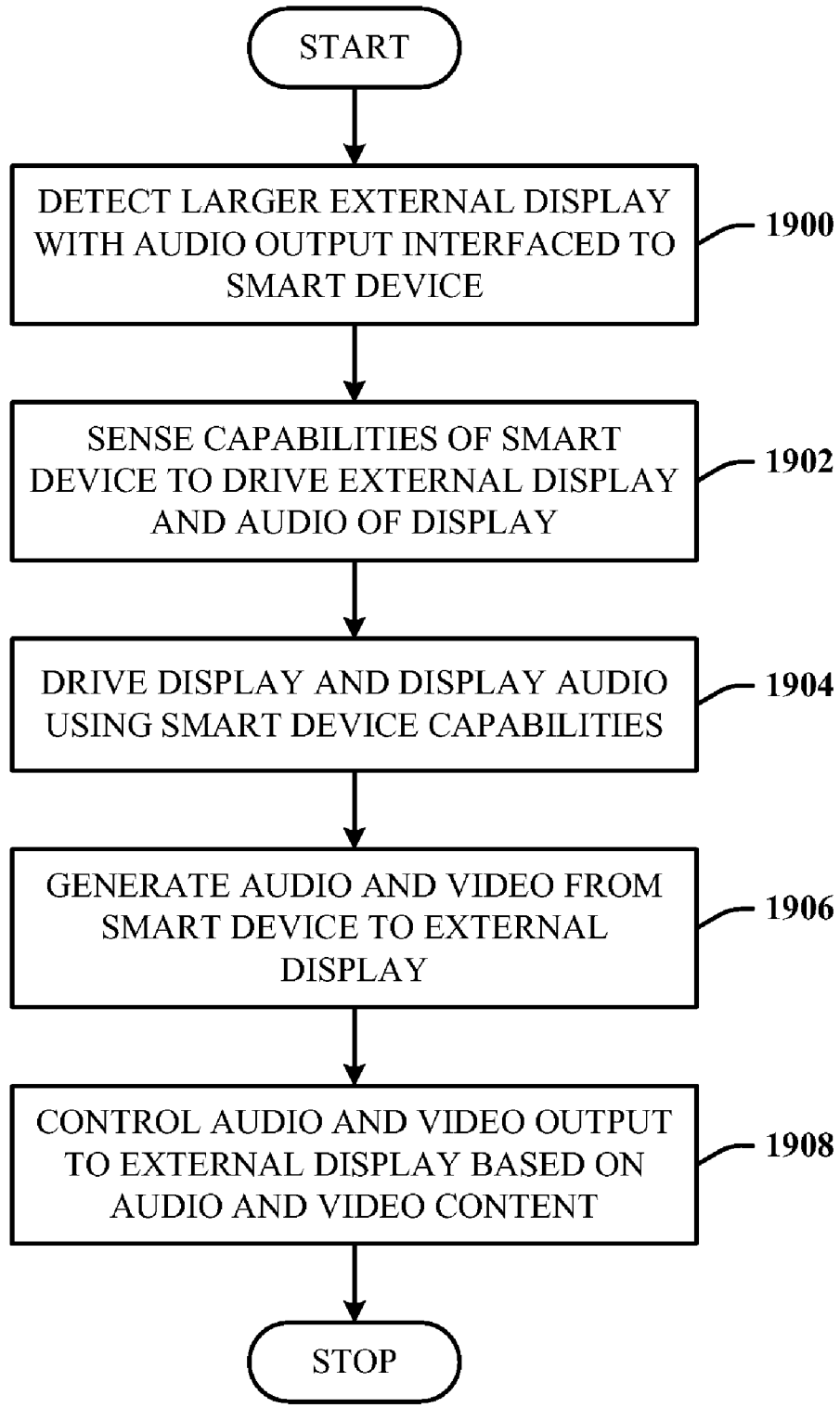
FIG. 19 illustrates a method of managing audio and video output associated with a peripheral device.

FIG. 19 illustrates a method of managing audio and video output associated with a peripheral device. At 1900, an external larger display with audio capability is detected and interfaced to a smart device (e.g., cell phone, PDA). At 1902, the capabilities of the smart device to drive the external display audio and video are sensed. At 1904, the smart device selects the driver software and drives the display audio and video functionality. At 1906, the smart device generates audio and video output to the display. At 1908, the audio and video output to the external display is controlled from the smart device based on the audio and video content.

Figure 20:
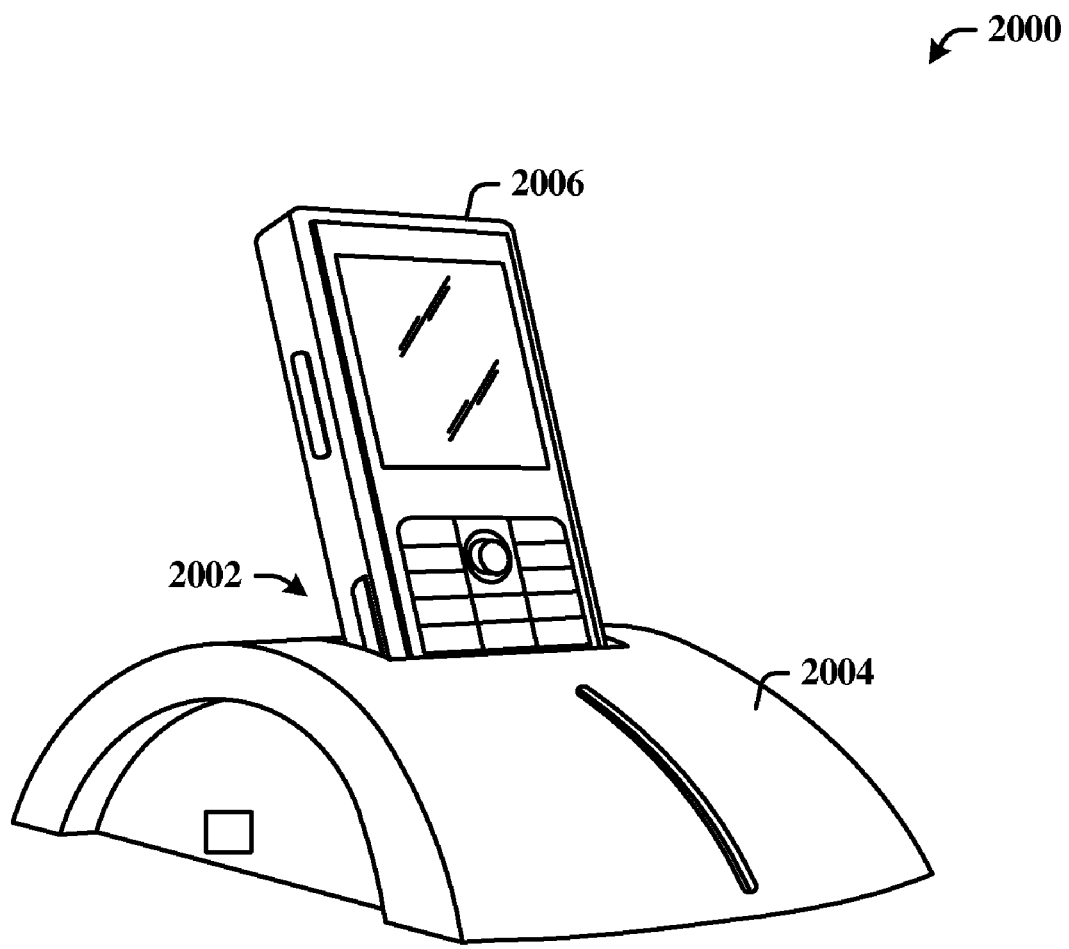
FIG. 20 illustrates a perspective of an exemplary smart interface system that includes a cradle in a smart system housing for receiving a mobile communications device.

FIG. 20 illustrates a perspective of an exemplary passive interface system 2000 that includes a cradle 2002 in a passive system housing 2004 for receiving a mobile communications device 2006.

Figure 21:
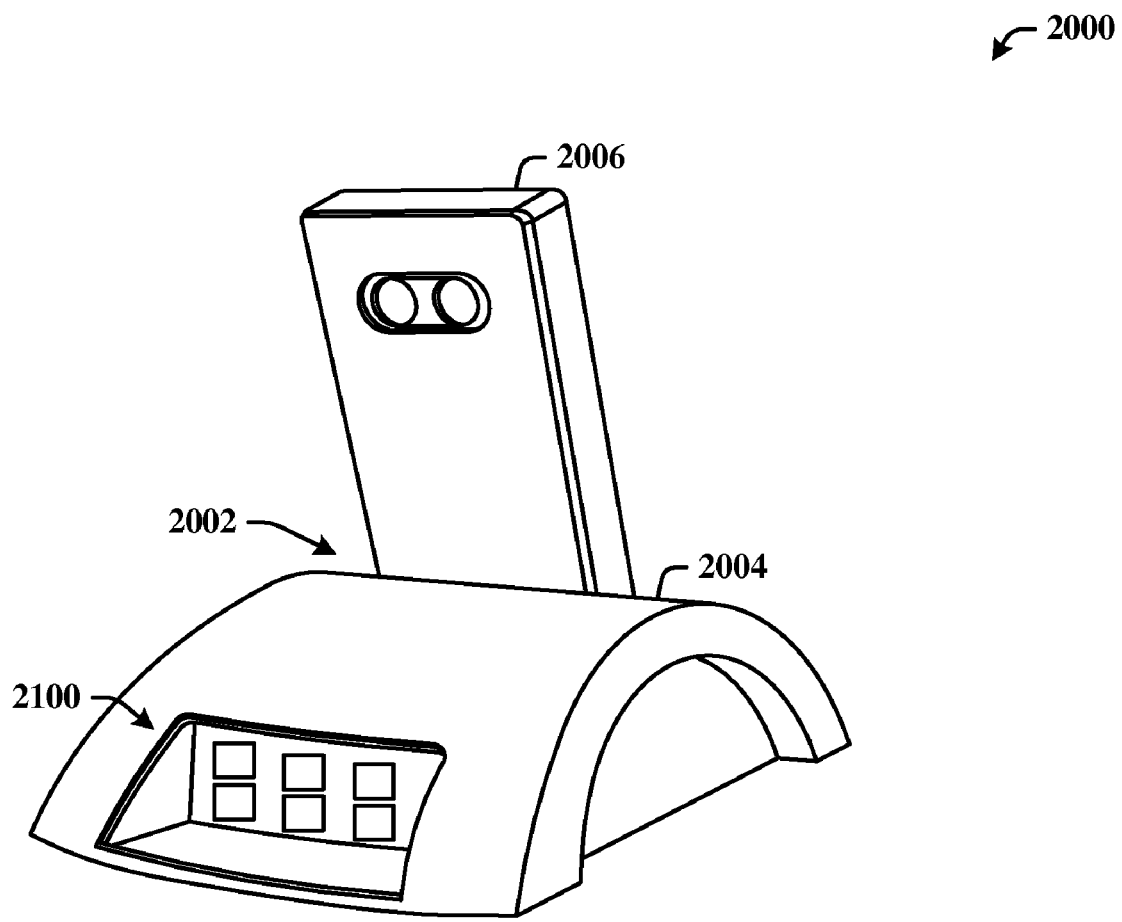
FIG. 21 illustrates a different perspective of an exemplary smart interface system that includes the cradle in the housing for receiving the mobile communications device.

FIG. 21 illustrates a different perspective of an exemplary passive interface system 2100 that includes the cradle 2102 in the housing 2104 for receiving the mobile communications device 2106. The system 2100 also shows an external connector interface 2100 for USB, video, and network connectors, for example.

Figure 22:
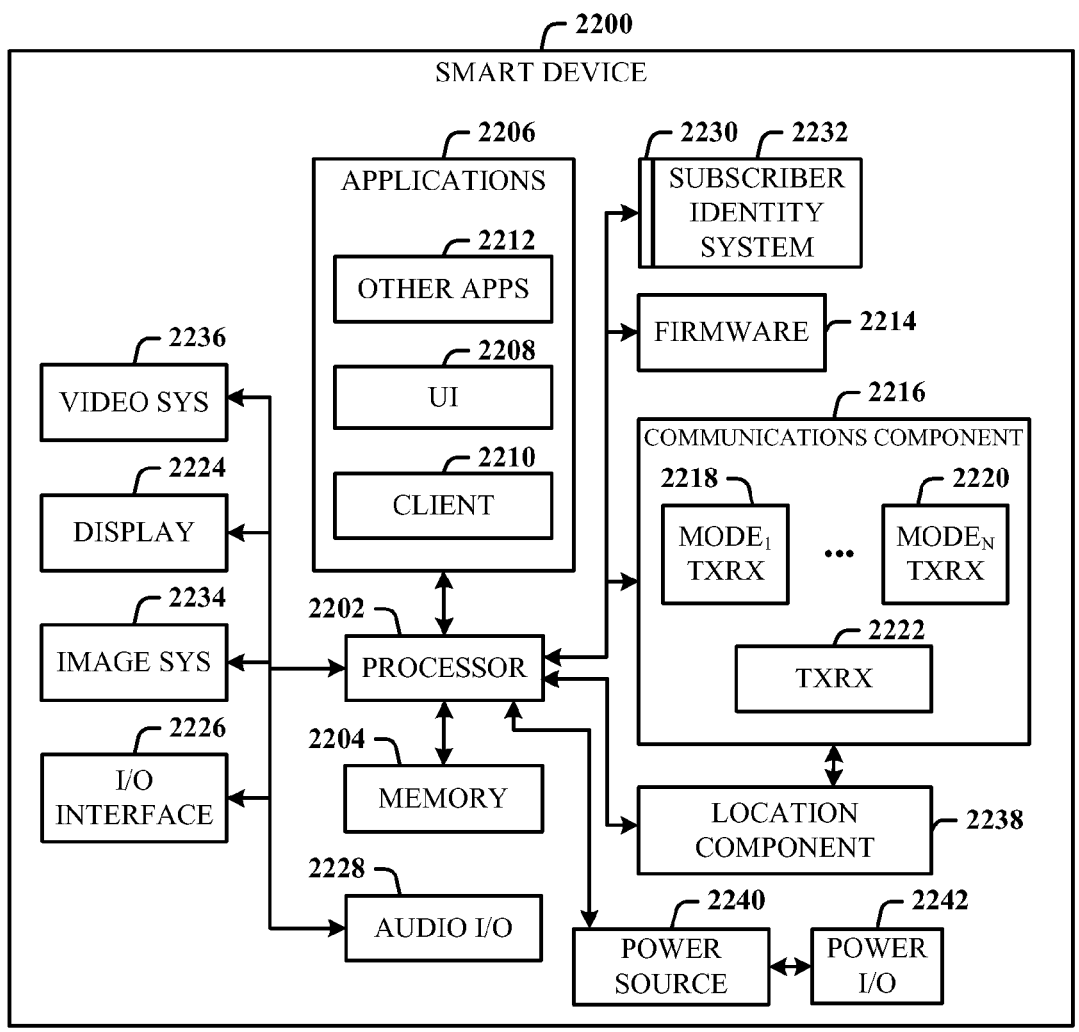
FIG. 22 illustrates a schematic block diagram of an exemplary multimode mobile communications device operable to interact with the passive interface system and display management functionality.

FIG. 22 illustrates a schematic block diagram of an exemplary smart device 2200 operable to interact with the passive system and associated functionality. In order to provide additional context for various aspects thereof, FIG. 22 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The smart device 2200 (e.g., a cell phone, PDA) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the mobile device systems.

The smart device 2200 includes a processor 2202 for controlling and processing onboard operations and functions. A memory 2204 interfaces to the processor 2202 for the storage of data and one or more applications 2206 (e.g., a video player software, user feedback component software, etc.).

The applications 2206 can include the configuration component comprising the drivers and support programs for interfacing to the passive system 102. For example, the applications 2206 operate to analyze the capabilities of the smart device 2200, and then adjust the behavior of the smart device 2200 accordingly to interface through the passive system 102 to the connected peripherals, networks and/or displays. The applications also facilitate direct (e.g., wired and/or wireless) communications with the external systems.

The applications 2206 can also include a user interface (UT) application 2208 that operates with a client 2210 (e.g., operating system) to facilitate user interaction with handset functionality and data, for example, answering/initiating calls, entering/deleting data, configuring settings, address book manipulation, multimode interaction, etc. The applications 2206 can include other applications 2212 that came installed with the handset 2206 and/or can be installed as add-ons or plug-ins to the client 2210 and/or UT 2208, for example, or for other purposes (e.g., processor, firmware, etc.).

The other applications 2212 can include voice recognition of predetermined voice commands that facilitate user control, call voice processing, voice recording, messaging, e-mail processing, video processing, image processing, music play, as well as subsystems or components described infra. Some of the applications 2206 can be stored in the memory 2204 and/or in a firmware 2214, and executed by the processor 2202 from either or both the memory 2204 or/and the firmware 2214. The firmware 2214 can also store code for execution in power-up initialization and control during normal operation of the smart device 2200.

A communications component 2216 can interface to the processor 2202 to facilitate wired/wireless communications with external systems, for example, cellular networks, VoIP (voice-over-IP) networks, local wireless networks or personal wireless networks such as Wi-Fi, Wi-Max, and so on. Here, the communications component 2216 can also include a multimode communications subsystem for providing cellular communications via different cellular technologies. For example, a first cellular transceiver 2218 (e.g., GSM) can be one mode and an Nth transceiver 2220 can provide cellular communications via an Nth cellular network (e.g., UMTS), where N is a positive integer. The communications component 2216 can also include a transceiver 2222 for unlicensed communications (e.g., Wi-Fi, Wi-Max, Bluetooth, etc.) for corresponding communications. The communications component 2216 can also facilitate communications reception from terrestrial radio networks (e.g., broadcast), digital satellite radio networks, and Internet-based radio services networks.

The smart device 2200 can process IP data traffic via the communications component 2216 to accommodate IP traffic from an IP network such as, for example, the Internet, a corporate intranet, a home broadband network, a personal area network, etc., via an ISP or broadband cable provider. Thus, VoIP traffic can be utilized by the smart device 2200 and IP-based multimedia content can be received in an encoded and/or decoded format.

The smart device 2200 includes a display 2224 for displaying multimedia that include text, images, video, telephony functions (e.g., a Caller ID function), setup functions, menus, etc. The display 2224 can also accommodate the presentation of multimedia content (e.g., music metadata, messages, wallpaper, graphics, etc.).

An input/output (I/O) interface 2226 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 2226 can be utilized for updating and/or troubleshooting the smart device 2200, for example.

Audio capabilities can be provided via an audio I/O component 2228, which can include a speaker for the output of audio signals related to, for example, indication that the user pressed the proper key or key combination to initiate the user feedback signal, call signals, music, etc. The audio I/O component 2228 also facilitates the input of audio signals via a microphone to record data and/or telephony voice data, and for inputting voice signals for telephone conversations.

The smart device 2200 can include a slot interface 2230 for accommodating a subscriber identity system 2232 that can accommodate a SIM or universal SIM (USIM), and interfacing the subscriber identity system 2232 with the processor 2202. However, it is to be appreciated that the subscriber identity system 2232 can be manufactured into the smart device 2200 and updated by downloading data and software thereinto, such as the access information described herein.

An image capture and processing system 2234 (e.g., a camera) can be provided for decoding encoded image content. Additionally, as indicated, photos can be obtained via an associated image capture subsystem of the image system 2234. The smart device 2200 can also include a video component 2236 for processing video content received and, for recording and transmitting video content.

Optionally, a geolocation component 2238 (e.g., GPS-global positioning system) facilitates receiving geolocation signals (e.g., from satellites via the communications component 2216) that define the location of the smart device 2200. Alternatively, or in combination therewith, the geolocation component 2238 can facilitate triangulation processing for locating the smart device 2200.

The smart device 2200 also includes a power source 2240 in the form of batteries and/or an AC power subsystem, which power source 2240 can interface to an external power system or charging equipment (not shown) via a power I/O component 2242.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interface system comprising:
an external interface component comprising a network interface and a USB hub configured to interface peripheral devices and a network to a smart device, the network interface being configured to facilitate IP data traffic between the smart device and an IP network entity;
a cradle interface configured to mechanically receive the smart device and electrically interface the smart device to the peripheral devices and the network via the external interface component;
a communications component configured to communicate data and signals between the smart device and the interface system via wire and wireless communications protocols;
a power component configured to charge the smart device;
a security component configured to perform authorization of the smart device and:
provide access to the peripheral devices based on the authorization;
in an instance when the smart device is authorized, allow the smart device to charge via the power component; and
in an instance when the smart device is not authorized, prevent the smart device from charging via the power component.

2. The interface system of claim 1, wherein the smart device is a cell phone, the cell phone interfacing to the interface system via the cradle interface or via a tether to the external interface component.

3. The interface system of claim 1, wherein the smart device includes a configuration component configured to automatically change behavior of the smart device based on the smart device interfacing to the interface system.

4. The interface system of claim 3, wherein the cradle interface senses the smart device and sends a cradle signal to the configuration component, in response to which the configuration component queries the smart device for functionality suitable for driving a connected peripheral device and invokes the functionality for driving the connected peripheral device.

5. The interface system of claim 4, wherein the configuration component includes a wizard that automatically launches and walks through a setup procedure for configuration of the connected peripheral device, which is a TV.

6. The interface system of claim 3, wherein the configuration component automatically configures the smart device to operate with an individual peripheral device according to a predetermined configuration.

7. The interface system of claim 1, wherein the smart device is a cell phone, or a personal digital assistant device with mobile communications functionality.

8. The interface system of claim 1, wherein the network interface facilitates ad hoc peer-to-peer digital communications between the smart device and a computing system.

9. The interface system of claim 1, wherein the security component is further configured to provide encrypted communications between the interface system and the smart device.

10. The interface system of claim 1, further comprising a presentation component configured to present one or more of text, audio, images and video based on capabilities of the smart device and the peripheral devices.

11. An interface system comprising:
an external interface component comprising a network interface and a USB hub configured to interface peripheral devices and a network to a smart device, the network interface being configured to facilitate IP data traffic between the smart device and an IP network entity;
a cradle interface configured to mechanically receive the smart device and electrically interface the smart device to the peripheral devices and the network via the external interface component;
a communications component configured to communicate data and signals between the smart device and the interface system via wire or wireless communications protocols; and
a security component configured to:
perform authorization of the smart device and provide access to the peripheral devices based on the authorization; and
in an instance when the smart device is unauthorized, provide access to a website that instructs a user though a process for authorizing the smart device to obtain full access.

12. The interface system according to claim 11, wherein the security component comprises a subscriber identity module (SIM) card configured to allow a user of the smart device to remotely access the interface system.

13. The interface system according to claim 11, wherein the security component has an assigned IP address.

14. The interface system according to claim 11, the smart device being a cell phone.

15. The interface system according to claim 11, the peripheral devices comprising an auxiliary display.

16. The interface system of claim 11, wherein the interface system is configured to sense the smart device and send a signal to the smart device that invokes functionality which is compatible with driving an individual peripheral device.

17. The interface system of claim 16, wherein the functionality is invoked via a wizard that automatically launches and walks through a setup procedure for configuration of the individual peripheral device.

18. The interface system of claim 16, wherein the functionality is invoked via a device profile or a user profile stored in the smart device.

19. The interface system of claim 11, wherein the smart device automatically receives updates related to driving the peripheral devices.

20. An interface system comprising:
- an external interface component comprising a network interface and a USB hub configured to interface peripheral devices and a network to a smart device, the network interface being configured to facilitate IP data traffic between the smart device and an IP network entity, the peripheral devices including a printer;
- a cradle interface configured to mechanically receive the smart device and electrically interface the smart device to the peripheral devices and the network via the external interface component;
- a communications component configured to communicate data and signals between the smart device and the interface system via wire or wireless communications protocols; and
- a security component configured to:
  - perform authorization of the smart device and provide access to the peripheral devices based on the authorization; and in an instance when the smart device is unauthorized, provide access to the printer to print instructions for authorizing the smart device.

\* \* \* \* \*

UNITED STATES PATENT AND TRADEMARK OFFICE
CERTIFICATE OF CORRECTION

| | | |
|---|---|---|
| PATENT NO. | : 8,165,633 B2 | Page 1 of 1 |
| APPLICATION NO. | : 11/968195 | |
| DATED | : April 24, 2012 | |
| INVENTOR(S) | : Chang et al. | |

It is certified that error appears in the above-identified patent and that said Letters Patent is hereby corrected as shown below:

In The Specification

In column 5, line 2, delete "though" and insert -- through --, therefor.

In column 5, line 34, delete "though" and insert -- through --, therefor.

In column 5, line 37, delete "though" and insert -- through --, therefor.

In column 14, line 32, delete "provided" and insert -- provide --, therefor.

In column 17, line 43, delete "(UT)" and insert -- (UI) --, therefor.

In column 17, line 50, delete "UT" and insert -- UI --, therefor.

In The Claims

In column 20, line 50, In Claim 11, delete "though" and insert -- through --, therefor.

Signed and Sealed this
Third Day of February, 2015

Michelle K. Lee
*Deputy Director of the United States Patent and Trademark Office*